(12) United States Patent
Kimura et al.

(10) Patent No.: US 8,576,351 B2
(45) Date of Patent: Nov. 5, 2013

(54) ILLUMINATING LENS, LIGHTING DEVICE, SURFACE LIGHT SOURCE, AND LIQUID-CRYSTAL DISPLAY APPARATUS

(75) Inventors: Syunsuke Kimura, Hyogo (JP); Daizaburo Matsuki, Osaka (JP); Tomoko Iiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 368 days.

(21) Appl. No.: 12/705,076

(22) Filed: Feb. 12, 2010

(65) Prior Publication Data
US 2010/0208167 A1 Aug. 19, 2010

(30) Foreign Application Priority Data

Feb. 12, 2009 (JP) ................ 2009-029350
Jun. 19, 2009 (JP) ................ 2009-146770

(51) Int. Cl.
*G02F 1/1335* (2006.01)
*F21V 3/00* (2006.01)
*F21V 5/00* (2006.01)
*F21V 5/04* (2006.01)

(52) U.S. Cl.
USPC ............ 349/62; 349/64; 349/69; 362/311.02; 362/311.06; 362/327; 362/328; 362/329; 362/333; 362/334; 362/335

(58) Field of Classification Search
USPC ............. 349/62, 64, 69; 362/311.02, 311.06, 362/327–329, 333–336
See application file for complete search history.

(56) References Cited

U.S. PATENT DOCUMENTS

| 7,153,002 | B2 | 12/2006 | Kim et al. |
| 7,348,723 | B2 | 3/2008 | Yamaguchi et al. |
| 7,474,475 | B2 | 1/2009 | Paek et al. |
| 7,602,559 | B2 | 10/2009 | Jang et al. |
| 8,075,157 | B2 | 12/2011 | Zhang et al. |
| 2004/0246606 | A1 | 12/2004 | Benitez et al. |
| 2004/0257826 | A1 | 12/2004 | Tatsukawa |
| 2005/0243577 | A1 | 11/2005 | Moon |

(Continued)

FOREIGN PATENT DOCUMENTS

| JP | 2004-087411 A | 3/2004 |
| JP | 2005-011704 | 1/2005 |

(Continued)

OTHER PUBLICATIONS

Co-pending U.S. Appl. No. 12/704,813, filed Feb. 12, 2010.

(Continued)

*Primary Examiner* — Jessica M Merlin
(74) *Attorney, Agent, or Firm* — Hamre, Schumann, Mueller & Larson, P.C.

(57) ABSTRACT

An illuminating lens includes a main body and a ring portion. The main body has a light exit surface, and the light exit surface has a first light exit surface recessed toward a point on the optical axis and a second light exit surface extending outwardly from the periphery of the first light exit surface. The first light exit surface has a transmissive region in the center thereof, and a total reflection region on the peripheral side thereof. The ring portion has a back surface configured to guide the light that has been emitted from a light source, totally reflected repeatedly at the light exit surface, and then entered the ring portion to an end surface by total reflection.

19 Claims, 21 Drawing Sheets

(56) References Cited

U.S. PATENT DOCUMENTS

| | | |
|---|---|---|
| 2006/0109669 A1 | 5/2006 | Tanaka et al. |
| 2006/0119250 A1 | 6/2006 | Suehiro et al. |
| 2006/0126343 A1* | 6/2006 | Hsieh et al. .............. 362/327 |
| 2006/0152932 A1 | 7/2006 | Wu |
| 2006/0239020 A1 | 10/2006 | Albou |
| 2007/0029563 A1 | 2/2007 | Amano et al. |
| 2007/0047232 A1 | 3/2007 | Kim et al. |
| 2007/0070530 A1* | 3/2007 | Seo et al. ................ 359/819 |
| 2007/0263390 A1 | 11/2007 | Timinger et al. |
| 2008/0007673 A1 | 1/2008 | Shiraishi et al. |
| 2008/0100773 A1 | 5/2008 | Hwang et al. |
| 2008/0174996 A1 | 7/2008 | Lu et al. |
| 2008/0278655 A1* | 11/2008 | Moon et al. ............... 349/58 |
| 2008/0303757 A1 | 12/2008 | Ohkawa et al. |
| 2009/0052193 A1 | 2/2009 | Zweig et al. |
| 2009/0109687 A1 | 4/2009 | Householder et al. |
| 2009/0268469 A1 | 10/2009 | Huang et al. |
| 2009/0273727 A1 | 11/2009 | Kubota et al. |
| 2010/0020264 A1 | 1/2010 | Ohkawa |
| 2010/0053973 A1* | 3/2010 | Shastry et al. ......... 362/296.05 |
| 2010/0195335 A1* | 8/2010 | Allen et al. ............... 362/309 |

FOREIGN PATENT DOCUMENTS

| | | |
|---|---|---|
| JP | 2005-317977 A | 11/2005 |
| JP | 2006-005791 A | 1/2006 |
| JP | 2006-113556 A | 4/2006 |
| JP | 2006-147448 | 6/2006 |
| JP | 2006-252841 A | 9/2006 |
| JP | 2006-309242 A | 11/2006 |
| JP | 3875247 B2 | 11/2006 |
| JP | 2007-026702 | 2/2007 |
| JP | 2007-034307 A | 2/2007 |
| JP | 2007-048775 A | 2/2007 |
| JP | 2007-096318 A | 4/2007 |
| JP | 2007-102139 A | 4/2007 |
| JP | 2007-287479 | 11/2007 |
| JP | 2008-015288 | 1/2008 |
| JP | 2008-305923 A | 12/2008 |
| KR | 10-2006-0040502 | 5/2006 |
| WO | 2007/021149 | 2/2007 |

OTHER PUBLICATIONS

Co-pending U.S. Appl. No. 12/705,016, filed Feb. 12, 2010.
Co-pending U.S. Appl. No. 12/704,926, filed Feb. 12, 2010.
Co-pending U.S. Appl. No. 12/720,249, filed Mar. 9, 2010.

* cited by examiner

ILLUMINATING LENS, LIGHTING DEVICE, SURFACE LIGHT SOURCE, AND LIQUID-CRYSTAL DISPLAY APPARATUS

BACKGROUND OF THE INVENTION

1. Field of the Invention

The present invention relates to an illuminating lens for widening a range of transmission directions for light from a light source such as a light emitting diode, and to a lighting device using this illuminating lens. The present invention further relates to a surface light source including a plurality of lighting devices, and to a liquid-crystal display apparatus in which this surface light source is disposed behind a liquid-crystal panel to serve as a backlight.

2. Description of Related Art

In a conventional backlight of a large-sized liquid-crystal display apparatus, a number of cold cathode tubes are disposed immediately below a liquid-crystal panel, and these cold cathode tubes are used with other members such as a diffusing plate and a reflecting plate. In recent years, light emitting diodes have been used as light sources for backlights. Light emitting diodes have increased their efficiency recently, and are expected to serve as low-power light sources to replace fluorescent lamps. In the case where light emitting diodes are used as a light source in a liquid-crystal display apparatus, the power consumption of the apparatus can be reduced by controlling the light and dark states of the light emitting diodes according to an image to be displayed.

In a backlight of a liquid-crystal display apparatus using light emitting diodes as a light source, a large number of light emitting diodes are disposed therein instead of cold cathode tubes. The use of a large number of light emitting diodes allows the entire surface of the backlight to have uniform brightness, but the need for such a large number of light emitting diodes is an obstacle to cost reduction. In view of this, attempts to increase the output power of each light emitting diode to reduce the required number of light emitting diodes have been made. For example, Japanese Patent No. 3875247 has proposed a lens that is designed to provide a uniform surface light source with a reduced number of light emitting diodes.

In order to obtain a uniform surface light source with a reduced number of light emitting diodes, the area to be irradiated with the light emitted from each light emitting diode needs to be increased. That is, light emitted from each light emitting diode needs to be spread to obtain a wider range of transmission directions for light from the diode. For this purpose, in Japanese Patent No. 3875247, a lens having a circular shape in a plan view is disposed on a light emitting diode as a chip to control the directivity of the chip. The light exit surface of this lens, through which light exits the lens, has a shape such that a portion in the vicinity of the optical axis is a concave and a portion surrounding the concave is a convex extending continuously from the concave.

On the other hand, JP 2008-305923 A has proposed a lens that is designed to provide a more uniform surface light source. In this lens, light that has been Fresnel reflected at the light exit surface of the lens back to the light entrance surface side thereof is reflected again by total reflection to be guided toward the surface to be irradiated.

A light emitting diode as a chip emits light mostly in the front direction of the light emitting diode chip. In the lens disclosed in Japanese Patent No. 3875247, light that has been emitted in the front direction of the chip is refracted at the concave surface in the vicinity of the optical axis and diffused. As a result, the surface to be irradiated is illuminated to have a wide illuminance distribution with a reduced illuminance in the vicinity of the optical axis.

In the lens disclosed in Japanese Patent No. 3875247, however, the light emitted from the light source needs to be refracted, and therefore the difference in height between the concave and the convex must be reduced to a certain level. That is, there is a limit to a widening of the range of transmission directions for light from the light source. The lens disclosed in JP 2008-305923 A has the same limit because it is designed to distribute the light emitted from the chip by utilizing the refraction of the light.

SUMMARY OF THE INVENTION

It is an object of the present invention to provide an illuminating lens capable of further widening the range of transmission directions for light from a light source, and to provide a lighting device, a surface light source, and a liquid-crystal display apparatus each including this illuminating lens.

In order to achieve the above object, the present inventors have considered it important, in obtaining a wider range of transmission directions for light from a light source, to distribute radially the intense light that has been emitted in the front direction of the light emitting diode chip, and come up with an idea of distributing radially the light emitted in the front direction of the light emitting diode chip by utilizing intentionally the total reflection of the light. Accordingly, the present inventors have conceived an illuminating lens described below.

That is, the illuminating lens is a lens for spreading light emitted from a light source so that a surface to be irradiated is irradiated with the spread light, and includes: a light entrance surface through which the light emitted from the light source enters the lens; and a light exit surface through which the light that has entered the lens exits the lens. The light exit surface has a first light exit surface and a second light exit surface. The first light exit surface is recessed toward a point on an optical axis of the illuminating lens, and the second light exit surface extends outwardly from a periphery of the first light exit surface to form a convex. The first light exit surface has a transmissive region located in the center of the first light exit surface and a total reflection region located around the transmissive region. When the position of the light source on the optical axis is defined as a starting point, the transmissive region transmits light that has been emitted from the starting point at a relatively small angle with respect to the optical axis and then reached the first light exit surface, and the total reflection region totally reflects light that has been emitted from the starting point at a relatively large angle with respect to the optical axis and then reached the first light exit surface. The second light exit surface has a shape capable of transmitting approximately the entire amount of light that has been emitted from the starting point and then reached the second light exit surface.

In the illuminating lens configured as described above, the range of transmission directions for light from the light source can be widened more by utilizing positively the total reflection of light. As shown in FIG. 21, in this illuminating lens, the light is totally reflected at the total reflection region of the first light exit surface in the light exit surface 112. Then, a part of the light again is totally reflected repeatedly at the second light exit surface extending outwardly from the first light exit surface, and returns to the light entrance surface 111 side. The light that has returned to the light entrance surface 111 side passes through the light entrance surface 111, and then is reflected at the member 130 (for example, a substrate) that faces the light entrance surface 111 so as to be guided toward the surface to be irradiated. In this case, the light that has been reflected at the member 130 to be guided to the surface to be irradiated travels in the direction away from the optical axis or travels in the direction toward the optical axis, as shown in FIG. 21. In order to obtain a wider illuminance distribution on the surface to be irradiated, it is effective also to guide the light that has returned to the light entrance surface 111 side in the direction away from the optical axis. The present invention has been made in view of the above circumstances.

The present invention provides an illuminating lens for spreading light emitted from a light source so that a surface to be irradiated is irradiated with the spread light. The lens includes: a main body to be disposed over the light source; and a ring portion joined to a periphery of the main body so as to be located around the light source. In this illuminating lens, the main body includes: a light entrance surface through which the light emitted from the light source enters the lens; and a light exit surface through which the light that has entered the lens exits the lens. The light exit surface has a first light exit surface and a second light exit surface. The first light exit surface is recessed toward a point on an optical axis of the illuminating lens, and the second light exit surface extends outwardly from a periphery of the first light exit surface to form a convex. The first light exit surface has a transmissive region located in the center of the first light exit surface and a total reflection region located around the transmissive region. The transmissive region transmits light that has been emitted from a starting point at a relatively small angle with respect to the optical axis and then reached the first light exit surface, when a position of the light source on the optical axis is defined as the starting point. The total reflection region totally reflects light that has been emitted from the starting point at a relatively large angle with respect to the optical axis and then reached the first light exit surface. The second light exit surface has a shape capable of transmitting approximately the entire amount of light that has been emitted from the starting point and then reached the second light exit surface, and of totally reflecting approximately the entire amount of the light that has been totally reflected at the total reflection region and then reached the second light exit surface. The ring portion has a front surface extending outwardly from a periphery of the light exit surface, a back surface extending outwardly from a periphery of the light entrance surface, and an end surface connecting an outer edge of the front surface and an outer edge of the back surface. The back surface has a shape such that light that has been emitted from the light source, totally reflected repeatedly at the light exit surface, and then entered the ring portion is guided to the end surface by total reflection. The end surface has a shape such that light that has been totally reflected at the back surface and reached the end surface is refracted to reach the surface to be irradiated.

Herein, "approximately the entire amount" means at least 90% of the entire amount. It may be the entire amount, and may be an amount slightly smaller than the entire amount.

The present invention also provides a lighting device including: a light emitting diode for emitting light; and an illuminating lens for spreading light emitted from the light emitting diode so that a surface to be irradiated is irradiated with the spread light. This illuminating lens is the above-mentioned illuminating lens.

The present invention further provides a surface light source including: a plurality of lighting devices arranged in a plane; and a diffusing plate disposed to cover the plurality of lighting devices, and configured to receive on one surface thereof light emitted from the plurality of lighting devices and to emit the light from the other surface thereof in a diffused manner. Each of the plurality of lighting devices is the above-mentioned lighting device.

The present invention still further provides a liquid-crystal display apparatus including: a liquid-crystal panel; and the above-mentioned surface light source disposed behind the liquid-crystal panel.

According to the present invention, it is possible to obtain a wider range of transmission directions for light from the light source. Furthermore, according to the present invention, the ring portion allows the light that has returned to the light entrance surface side to be guided in the direction away from the optical axis, and thus a wider illuminance distribution on the surface to be irradiated can be obtained.

DETAILED DESCRIPTION OF THE INVENTION

First Embodiment

Figure 1:
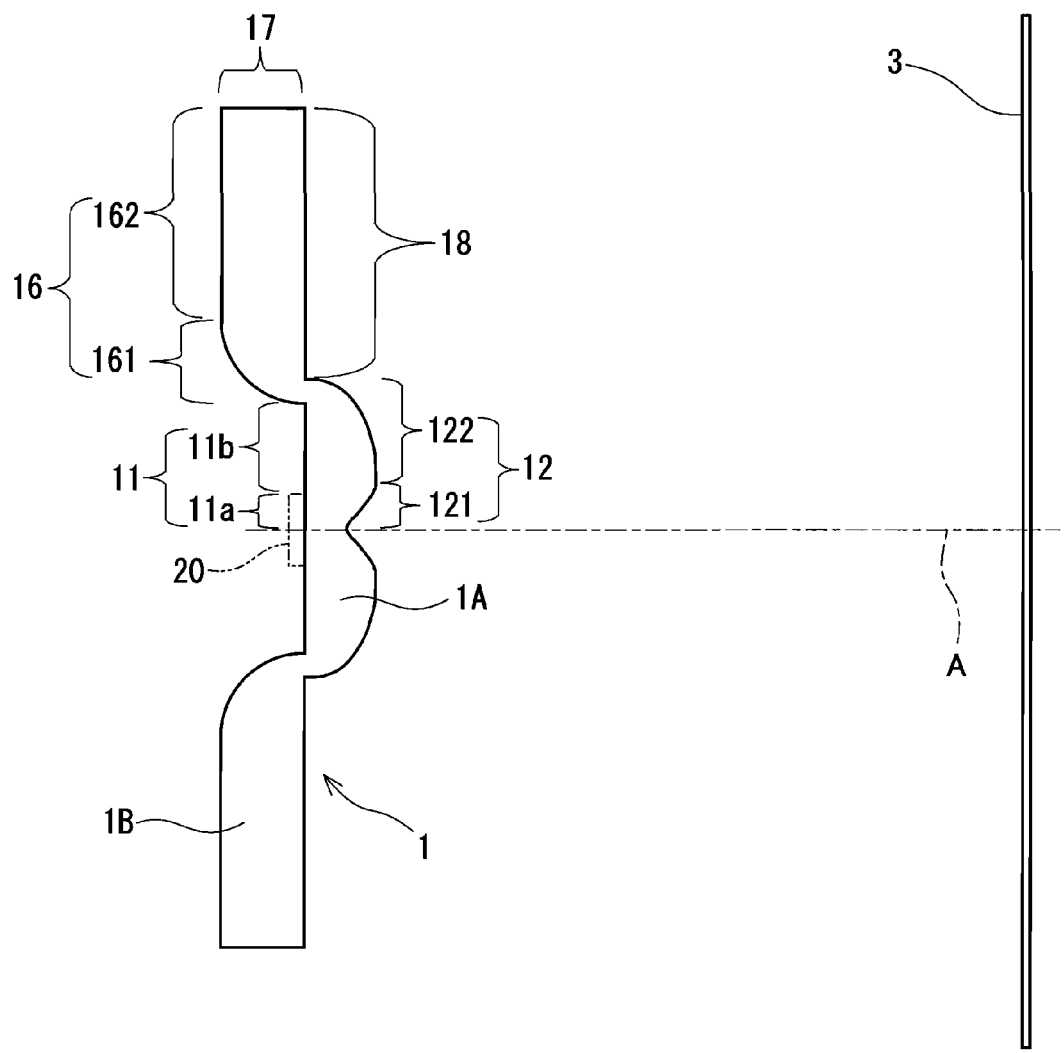
FIG. 1 is a schematic diagram of an illuminating lens according to a first embodiment of the present invention.

An illuminating lens according to the first embodiment of the present invention will be described with reference to the accompanying drawings. FIG. 1 is a schematic diagram of an illuminating lens 1 according to the first embodiment. The illuminating lens 1, which is disposed between a light source 20 having directivity and a surface to be irradiated 3, spreads light emitted from the light source 20 and emits the spread light to the surface to be irradiated 3. That is, the illuminating lens 1 widens the range of transmission directions for light from the light source. In the illuminance distribution on the surface to be irradiated 3, the illuminance is greatest on the optical axis A that is the design center line of the illuminating lens 1 and decreases almost monotonically toward the edge. The light source 20 and the illuminating lens 1 are disposed so that their optical axes coincide with each other.

Specifically, the illuminating lens 1 includes a main body 1A to be disposed over the light source 20, and a ring portion 1B joined to the periphery of the main body 1A so as to be located around the light source 20.

The main body 1A has a light entrance surface 11 through which the light emitted from the light source 20 enters the lens and a light exit surface 12 through which the light that has entered the lens exits the lens. In the present embodiment, the light exit surface 12 is axisymmetric with respect to the optical axis A. In the present embodiment, the light entrance surface 11 also is axisymmetric with respect to the optical axis A. That is, the central region 11a and the annular region 11b surrounding the central region 11a of the light entrance surface 11 are in the same plane. The central region 11a of the light entrance surface 11 is connected optically to the light source 20. It should be noted that the light entrance surface 11 need not be axisymmetric with respect to the optical axis A. For example, the central region 11a may be recessed in a shape conforming to the shape of the light source 20 (for example, a rectangular shape) so that the light source 20 is fitted in the recess. The central region 11a need not necessarily be joined directly to the light source 20. For example, the central region 11a may be recessed in a hemispherical shape so that an air space is formed between the central region 11a and the light source 20.

The light emitted from the light source 20 enters the illuminating lens 1 through the light entrance surface 11, exits the lens 1 through the light exit surface 12, and then reaches the surface to be irradiated 3. The light emitted from the light source 20 is spread by the action of the light exit surface 12, and reaches a large area of the surface to be irradiated 3.

As the light source 20, for example, a light emitting diode can be used. Light emitting diodes usually are chips with a rectangular plate shape. Therefore, it is preferable that the light entrance surface 11 of the illuminating lens 1 have a shape conforming to the shape of a light emitting diode to fit in close contact with the light emitting diode. The light emitting diode is in contact with the light entrance surface 11 of the illuminating lens 1 via a bonding agent, and connected optically to the light entrance surface 11. The light emitting diode usually is covered with a sealing resin to avoid contact with air. As a conventional sealing resin for a light emitting diode, an epoxy resin, silicone rubber, or the like is used.

The illuminating lens 1 is made of a transparent material having a specified refractive index. The refractive index of the transparent material is, for example, about 1.4 to 1.5. Examples of such a transparent material include resins such as epoxy resin, silicone resin, acrylic resin, and polycarbonate, and rubbers such as silicone rubber. Particularly, it is preferable to use epoxy resin, silicone rubber, or the like that has been used as a sealing resin for a light emitting diode.

The light exit surface 12 includes a first light exit surface 121 that is recessed toward a point on the optical axis A, and a second light exit surface 122 extending radially outwardly from the periphery of the first light exit surface 121 to form a convex. Light enters the illuminating lens 1 through the light entrance surface 11 at a wide range of angles. Light that has entered the lens at a small angle with respect to the optical axis A reaches the first light exit surface 121, and light that has entered the lens at a larger angle with respect to the optical axis A reaches the second light exit surface 122.

Next, the shapes of the first light exit surface 121 and the second light exit surface 122 will be described. For that purpose, a starting point Q (see FIG. 2) is defined first, and then light emitted from the starting point Q is assumed. As stated herein, the starting point Q is the position of the light source on the optical axis A. In the case where a light emitting diode is used as a light source, the starting point Q is the point of intersection of the optical axis A and the light emitting surface that is the front surface of the light emitting diode. That is, the starting point Q is spaced from the light entrance surface 11 by the thickness of the above-mentioned bonding agent. When an angle between the optical axis A and a line connecting the starting point Q and the boundary between the first light exit surface 121 and the second light exit surface 122 is θb, light that has been emitted from the starting point Q at an angle reaches the first light exit surface 121 or the second light exit surface 122 based on the angle θb as a threshold angle.

Figure 2:
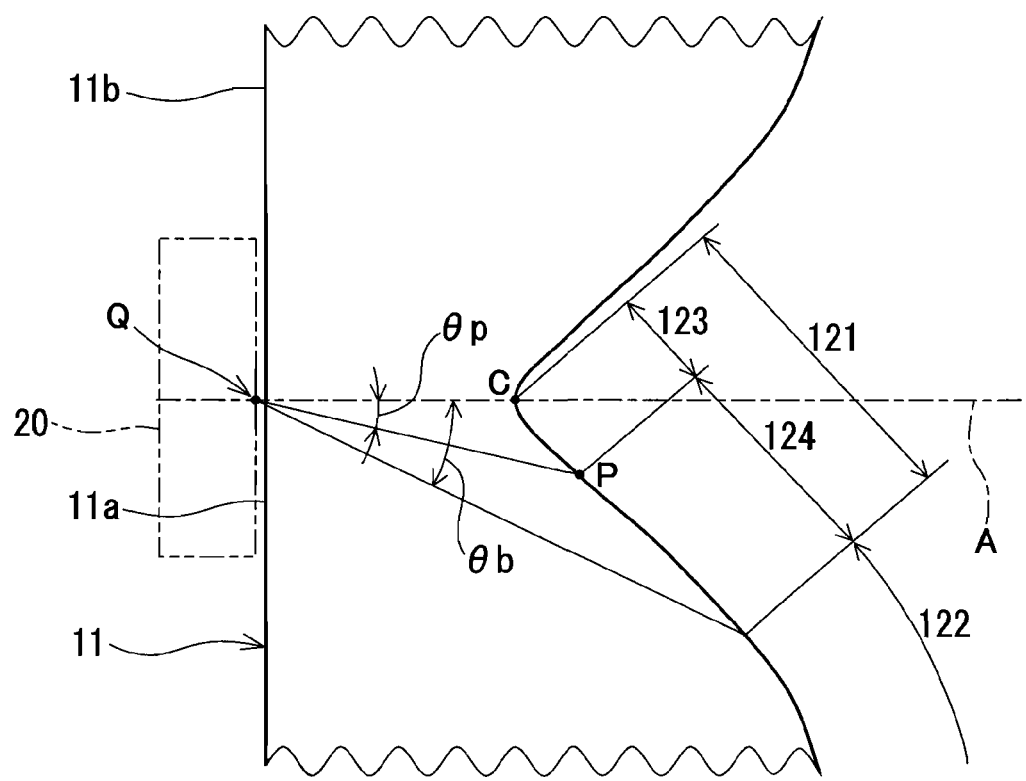
FIG. 2 is an enlarged view of the main portions of FIG. 1.

As shown in FIG. 2, the first light exit surface 121 includes a transmissive region 123 located in the center of the first light exit surface 121 and a total reflection region 124 located around the transmissive region 123. The transmissive region 123 transmits light that has been emitted from the starting point Q at a relatively small angle of less than a specified value of θp with respect to the optical axis A and reached the first light exit surface 121, and the total reflection region 124 totally reflects light that has been emitted from the starting point Q at a relatively large angle of θp or more with respect to the optical axis A and reached the first light exit surface 121. That is, θp is an angle between the optical axis A and a line connecting a point P and the starting point Q, when the point P is a point on the boundary between the transparent region 123 and the total reflection region 124.

Figure 4:
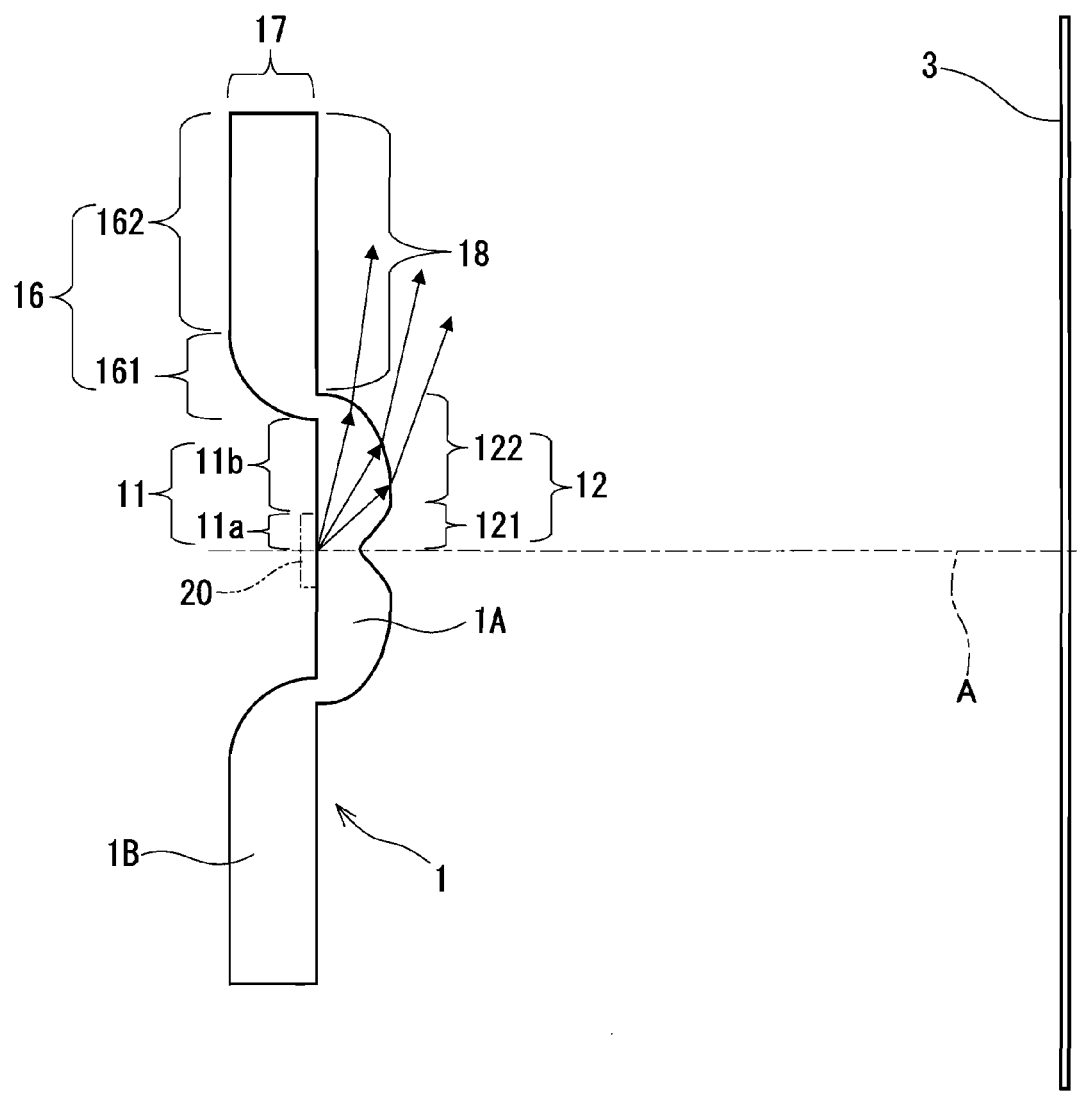
FIG. 4 is a diagram showing optical paths of light rays that reach a second light exit surface directly from a light entrance surface of the main body in the illuminating lens according to the first embodiment of the present invention.
Figure 5:
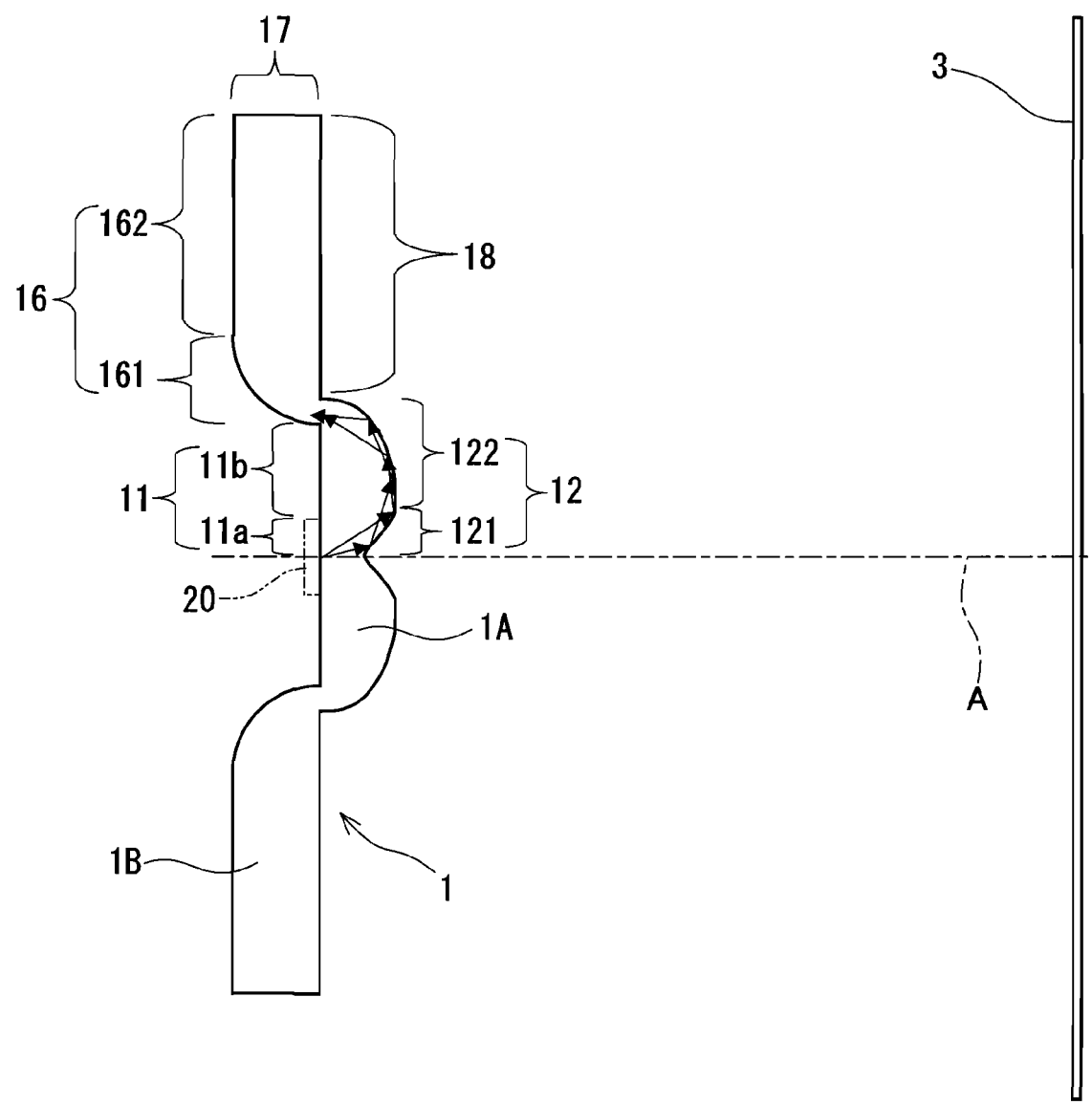
FIG. 5 is a diagram showing optical paths of light rays that are totally reflected at a total reflection region of the first light exit surface and then reach the second light exit surface of the main body in the illuminating lens according to the first embodiment of the present invention.

On the other hand, the second light exit surface 122 has a shape capable of transmitting approximately the entire amount of light that has been emitted from the starting point Q and reached the second light exit surface 122, and totally reflecting approximately the entire amount of the light that has been totally reflected at the total reflection region 124 and reached the second light exit surface 122 (see FIG. 4 and FIG. 5). The angle between the optical axis A and the light emitted from the starting point Q increases toward the outer edge of the second light exit surface 122. The angle of the light emitted from the starting point Q with respect to a normal line at the point on the second light exit surface 122 reached by the emitted light is the incident angle of the light with respect to the second light exit surface 122. An excessively large incident angle causes total reflection. The incident angle needs to be kept small in order to prevent total reflection. Accordingly, the second light exit surface 122 has a shape such that the angle between the normal line and the optical axis A increases with increasing distance from the optical axis A. That is, the shape of the second light exit surface 122 is a convex.

The entire second light exit surface 122 need not necessarily transmit the light emitted from the starting point Q (i.e., the second light exit surface 122 need not transmit the entire amount of the light). The second light exit surface 122 may have a shape capable of totally reflecting a part of the light emitted from the starting point Q and transmitting the remaining part of the light.

The ring portion 1B is axisymmetric with respect to the optical axis A in the present embodiment. Specifically, the ring portion 1B has a front surface 18 extending outwardly from a periphery of the light exit surface 12, a back surface 16 extending outwardly from a periphery of the light entrance surface 11, and an end surface 17 connecting an outer edge of the front surface 18 and an outer edge of the back surface 16.

The back surface 16 has a shape such that light that has been emitted from the light source 20, totally reflected repeatedly at the light exit surface 12, and then entered the ring portion 1B is guided to the end surface 17 by total reflection. On the other hand, the end surface 17 has a shape such that light that has been totally reflected at the back surface 16 and reached the end surface 17 is refracted to reach the surface to be irradiated 3.

For more detail, the back surface 16 has a first region 161 extending outwardly from the periphery of the light entrance surface 12 to form a convex, and a flat second region 162 extending continuously from the first region 161. In the present embodiment, the front surface 18 also is a flat surface parallel to the second region 162 of the back surface 16 (in other words, perpendicular to the optical axis A), and the end surface 17 is a cylindrical surface orthogonal to the second region 162 of the back surface 16 and the front surface 18. The end surface 17 need not necessarily be parallel to the optical axis A. It may be a tapered shape with its diameter decreasing from the back surface 16 toward the front surface 18. The cross-sectional shape of the end surface 17 need not be linear, and it may be arcuate.

It is preferable that the second region 162 have a larger width than the first region 161 in the direction radially outward from the optical axis A. With such a configuration, a larger amount of light that has been totally reflected at the first region 161 can be totally reflected at the second region 162, and therefore a larger amount of light can be guided from the end surface 17 toward the surface to be irradiated 3.

Furthermore, it is preferable that the distance from the light entrance surface 11 to the second region 162 is longer than the maximum distance from the light entrance surface 11 to the light exit surface 12 in the optical axis direction in which the optical axis A extends. In other words, it is preferable that the curvature radius of the first region 161 is as large as possible. With such a configuration, the amount of light leaking from the lens through the first region 161 (that is, the amount of light passing through the first region 161) can be reduced, and therefore the light that has returned to the light entrance surface 11 side can be utilized effectively.

Furthermore, it is preferable that a tangential direction of an outermost periphery of the second light exit surface 122 is approximately parallel to that of an innermost periphery of the first region 161 in a cross-sectional view including the optical axis A. With such a configuration, the amount of light leaking from the lens through the first region 161 (that is, the amount of light passing through the first region 161) can be reduced, and therefore the light that has returned to the light entrance surface 11 side can be utilized effectively.

It also is preferable that the tangential direction of the innermost periphery of the first region 161 is parallel to the optical axis A in a cross-sectional view including the optical axis A. With such a configuration, the amount of light leaking from the lens through the first region 161 (that is, the amount of light passing through the first region 161) can be reduced, and therefore the light that has returned to the light entrance surface 11 side can be utilized effectively.

Next, with reference to FIGS. 3 to 8, how the light emitted from the light source 20 travels will be described in more detail by taking the light emitted from the starting point Q as a typical example.

Figure 3:
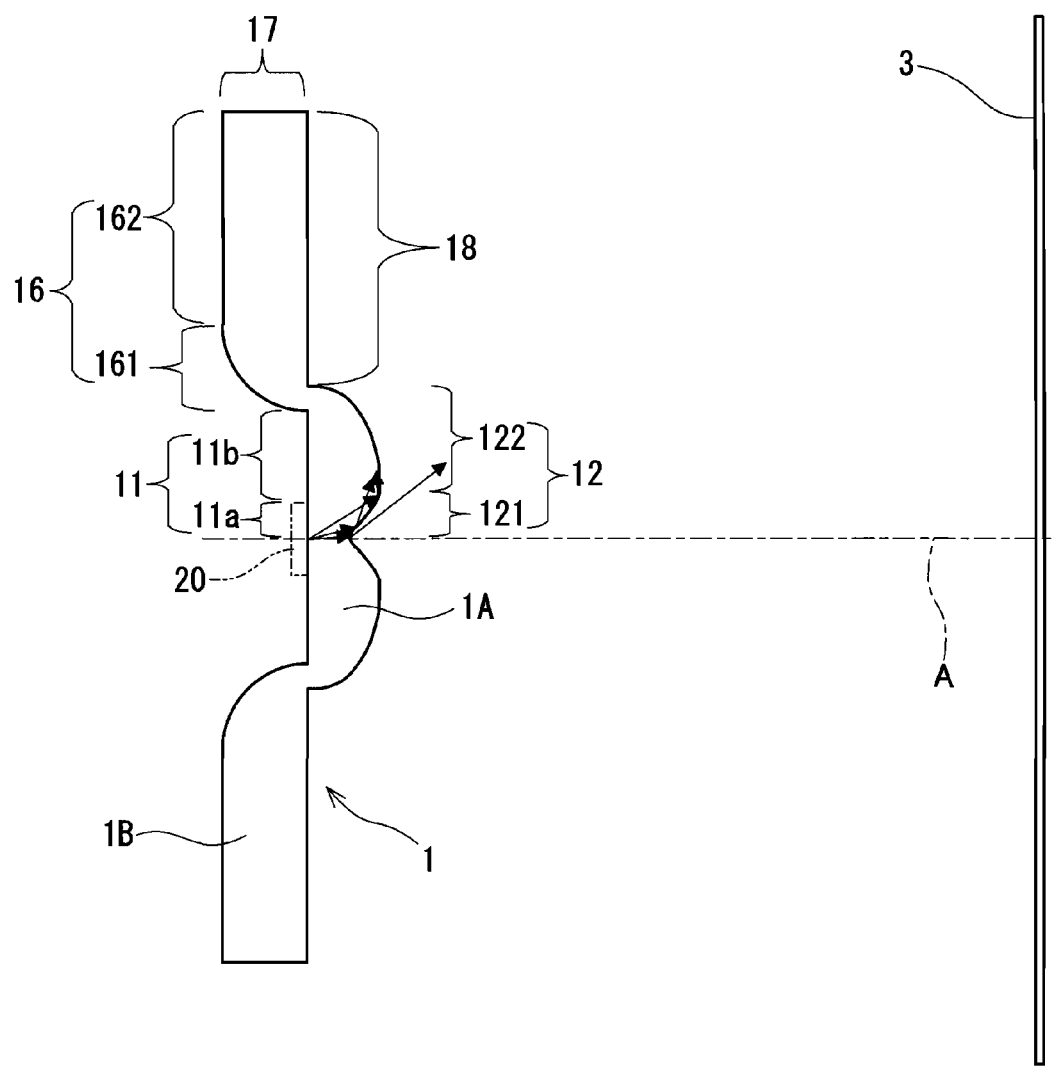
FIG. 3 is a diagram showing optical paths of light rays that reach a first light exit surface of a main body in the illuminating lens according to the first embodiment of the present invention.

FIG. 3 shows optical paths of light rays that enter the lens through the light entrance surface 11 and reach the first light exit surface 121. The light ray that has reached the transmissive region 123 due to a small angle with respect to the optical axis A (see FIG. 2) is refracted at the first light exit surface 121 and then reaches the surface to be irradiated 3. The light rays that have reached the total reflection region 124 due to larger angles with respect to the optical axis A (see FIG. 2) are totally reflected at the first light exit surface 121 and then travel inside the main body 1A.

FIG. 4 shows optical paths of light rays that enter the lens through the light entrance surface 11 and reach the second light exit surface 122. The light rays that have reached the second light exit surface 122 are refracted at the second light exit surface 122 and then reach the surface to be irradiated 3.

FIG. 5 shows optical paths of light rays that are totally reflected at the total reflection region 124 of the first light exit surface 121 as described in FIG. 3 and reach the second light exit surface 122. The light rays that have reached the second light exit surface 122 are totally reflected one or more times at the second light exit surface 122 so that they travel along the second light exit surface 122 in the main body 1A and enters the ring portion 1B. Although not illustrated here, some of the light rays are not totally reflected at the second light exit surface 122 and exit the main body 1A.

Figure 6:
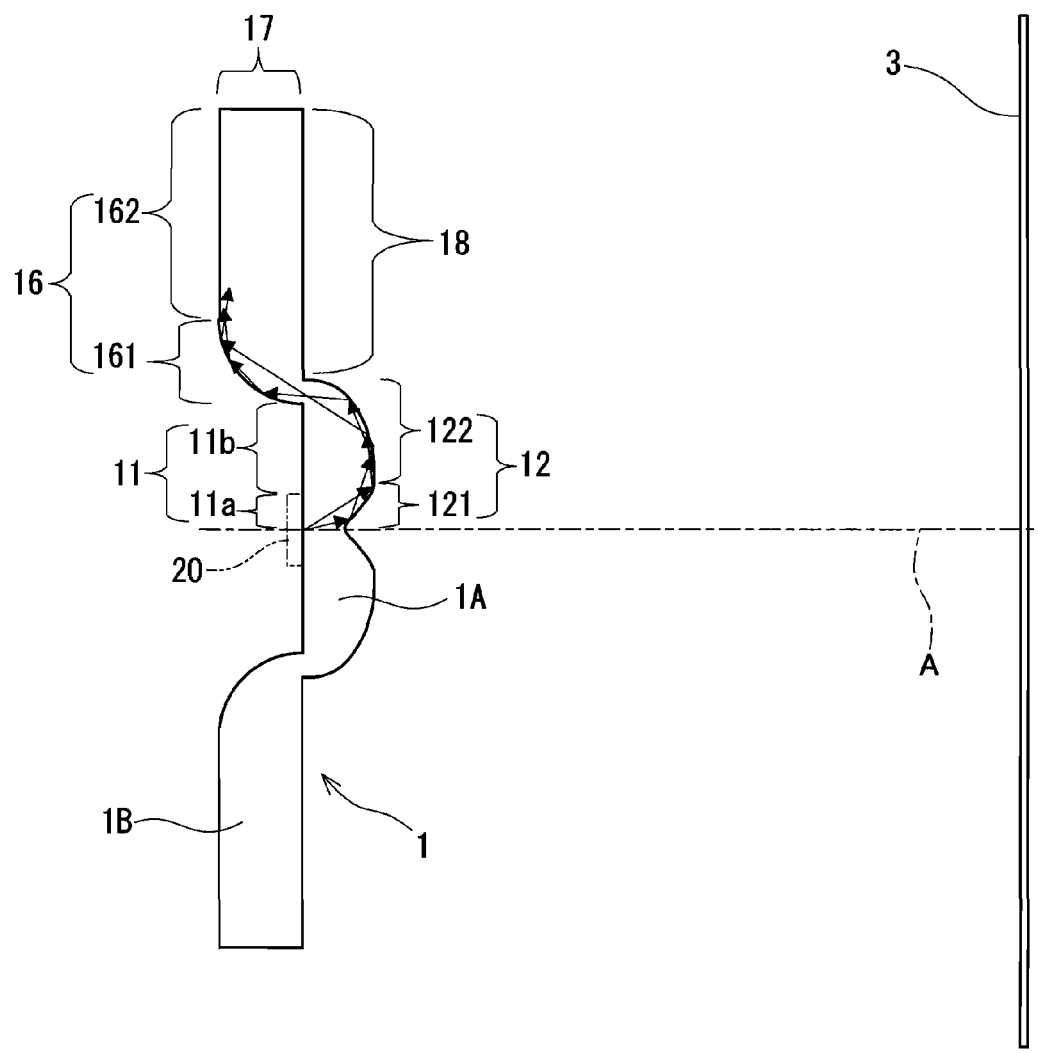
FIG. 6 is a diagram showing optical paths of light rays that are totally reflected at the second light exit surface and then reach a first region of a back surface of the ring portion in the illuminating lens according to the first embodiment of the present invention.

FIG. 6 shows optical paths of light rays that enter the ring portion 1B as described in FIG. 5 and reach the first region 161 of the back surface 16 of the ring portion 1B. The light rays that have reached the first region 161 are totally reflected one or more times at the first region 161 so that they travel toward the second region 162 or the end surface 17. Although not illustrated here, some of the light rays are not totally reflected at the first region 161 and exit the ring portion 1B.

Figure 7:
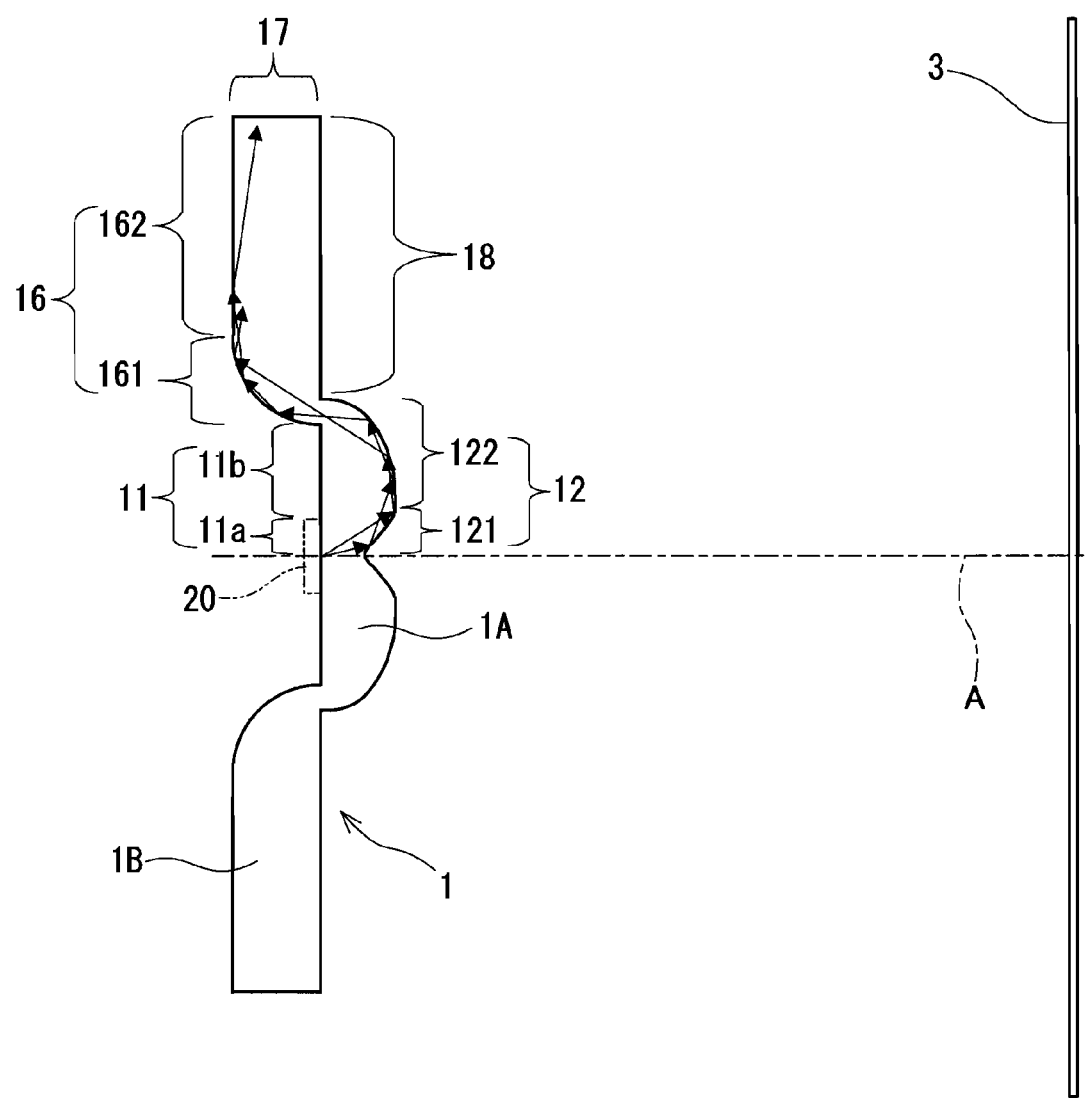
FIG. 7 is a diagram showing an optical path of a light ray that is totally reflected at the first region and then reaches a second region of the back surface of the ring portion in the illuminating lens according to the first embodiment of the present invention.

FIG. 7 shows an optical path of a light ray that is totally reflected at the first region 161 as described in FIG. 6 and reaches the second region 162 of the back surface 16 of the ring portion 1B. The light rays that have reached the second region 162 are totally reflected at the second region 162 one time and travel toward the end surface 17. Although not illustrated here, some of the light rays are not totally reflected at the second region 162 and exit the ring portion 1B.

Figure 8:
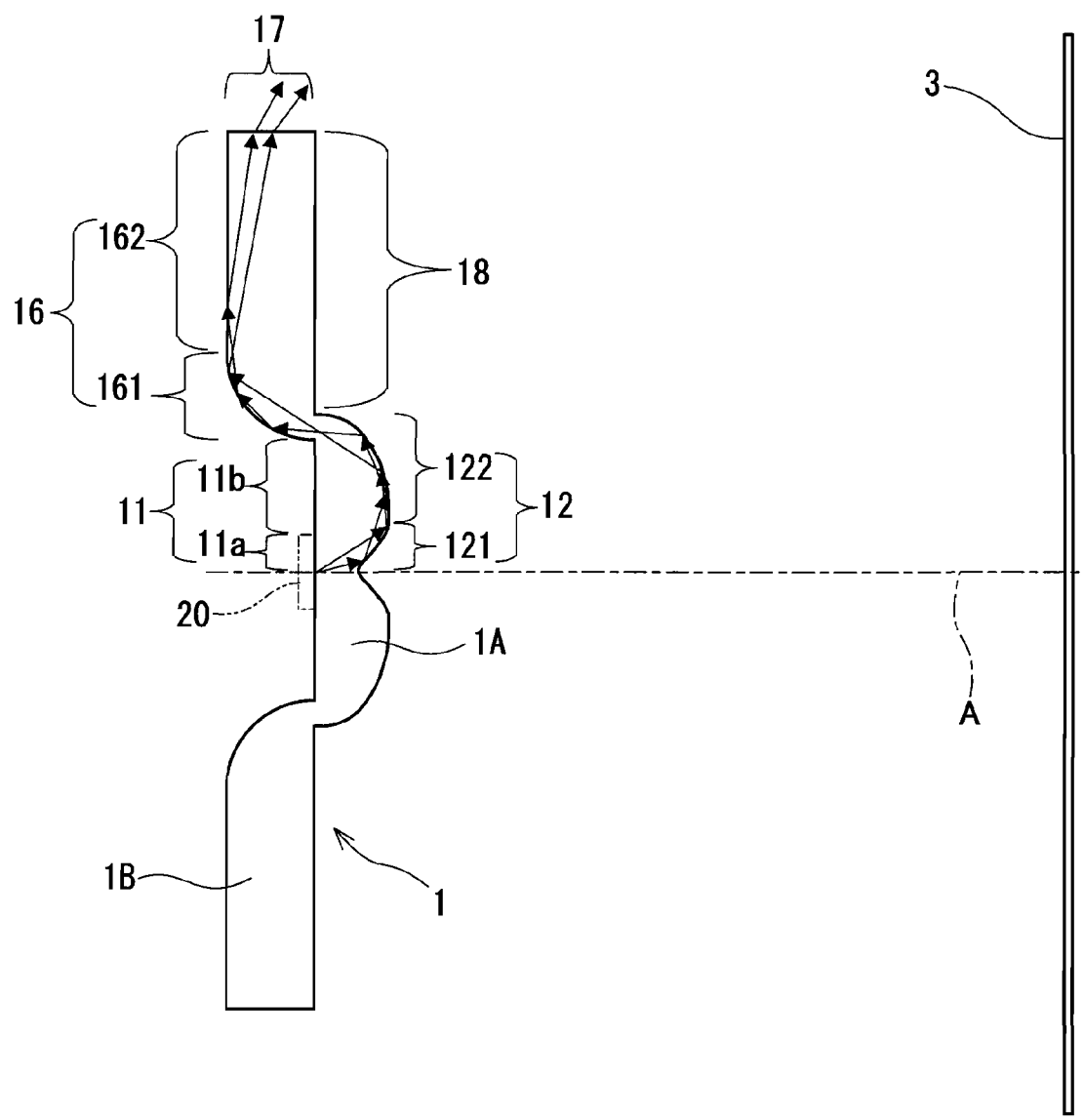
FIG. 8 is a diagram showing optical paths of light rays that are totally reflected at the first region and the second region of the back surface and then reach an end surface of the ring portion in the illuminating lens according to the first embodiment of the present invention.

FIG. 8 shows optical paths of light rays that are totally reflected at the first region 161 and the second region 162 of the back surface 16 as described in FIG. 6 and FIG. 7 and reach the end surface 17. The light rays that have reached the end surface 17 are refracted at the end surface 17 and reach the surface to be irradiated 3.

In the illuminating lens 1 configured as described above, the most part of the light that has been emitted from the light source 20 and reached the transmissive region 123 located in the center of the first light exit surface 121 is refracted at the transmissive region 123, and thus the area surrounding the optical axis A of the lens on the surface to be irradiated 3 is irradiated with the refracted light. On the other hand, the most part of the light that has been emitted from the light source 20 and reached the total reflection region 124 located on the peripheral side of the first light exit surface 121 is totally reflected at the total reflection region 124. The most part of the totally reflected light enters the ring portion 1B and exits the ring portion 1B through the end surface 17, and then the surface to be irradiated 3 is irradiated with that light. Furthermore, the most part of the light that has been emitted from the light source 20 and reached the second light exit surface 122 is refracted at the second light exit surface 122, and thus the area away from the optical axis A of the lens on the surface to be irradiated 3 is irradiated with the refracted light. Accordingly, the illuminating lens 1 of the present embodiment allows the range of transmission directions for light from the light source 20 to be widened further.

Furthermore, in the present embodiment, the light that has returned to the light entrance surface 11 side also can be guided in the direction away from the optical axis by the ring portion 1B. As a result, a wider illuminance distribution on the surface to be irradiated 3 can be obtained. In addition, such control of the light that has returned to the light entrance surface 11 side makes it possible to prevent the illuminance distribution on the surface to be irradiated 3 from being influenced by the configuration and reflectance of a structural member disposed behind the illuminating lens 1.

The illuminating lens of the present invention also is applicable to light sources (such as lasers and organic ELs) as well as light emitting diodes.

Figure 20A:
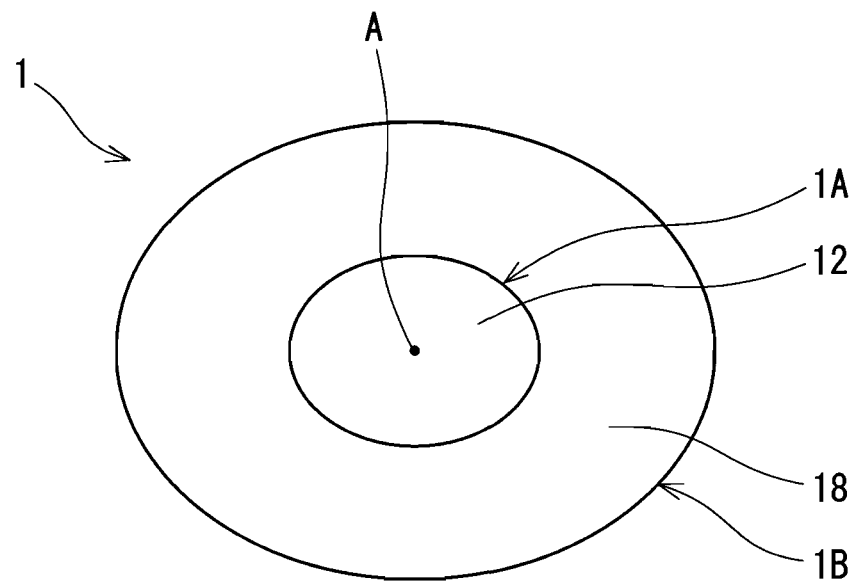
FIG. 20A and FIG. 20B are each a plan view of an illuminating lens of another embodiment.
Figure 20B:
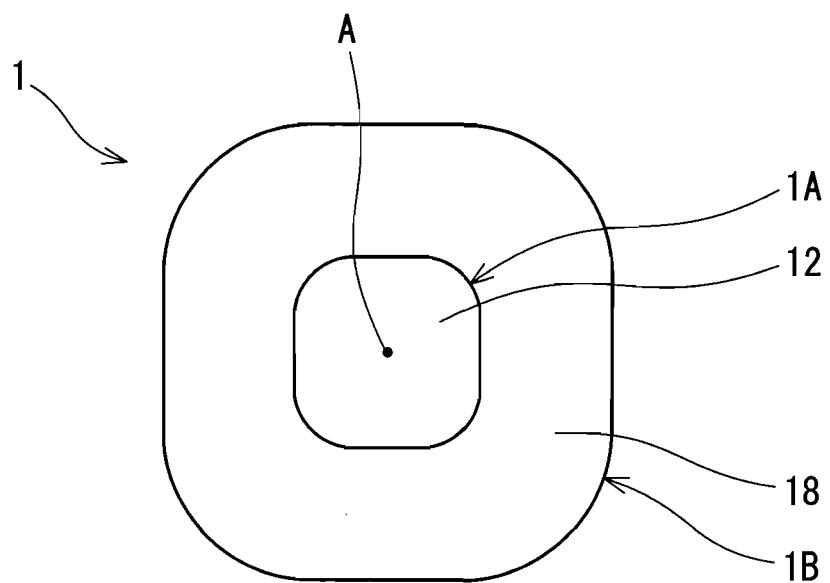
Figure 21:
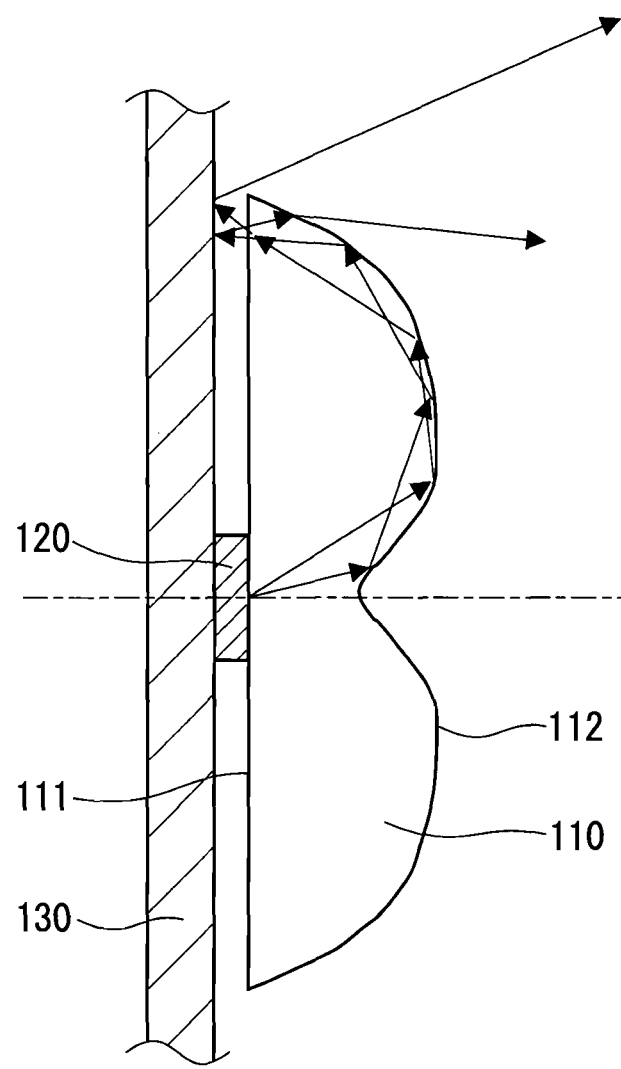
FIG. 21 is a schematic diagram of an illuminating lens that has been conceived before.

In the present embodiment, the light exit surface 12 is axisymmetric with respect to the optical axis A (circular shape in plan view). The light exit surface 12, however, need not be axisymmetric with respect to the optical axis A. For example, as shown in FIG. 20A, the light exit surface 12 may have an elliptical shape when viewed from the optical axis direction. In this case, the ring portion 1B also has an elliptical shape similar to that of the light exit surface 12 in plan view. This illuminating lens 1 is suitable particularly for an elongated light source. Alternatively, as shown in FIG. 20B, the light exit surface 12 may have a rounded rectangular shape when viewed from the optical axis direction.

Second Embodiment

Figure 9:
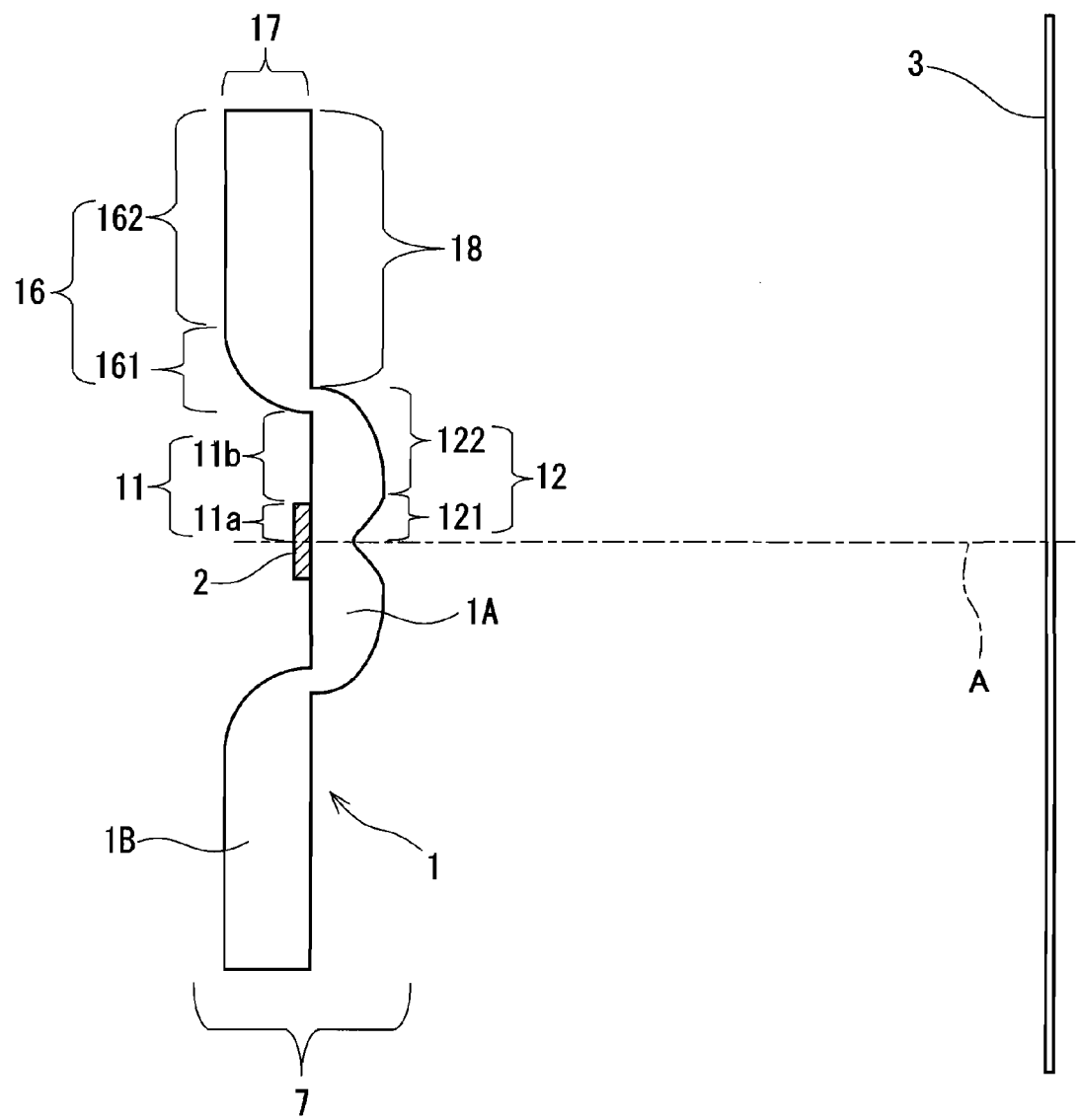
FIG. 9 is a schematic diagram of a lighting device according to a second embodiment of the present invention.

FIG. 9 is a schematic diagram of a lighting device 7 according to a second embodiment of the present invention. This lighting device 7 includes a light emitting diode 2 for emitting light, and an illuminating lens 1 of the first embodiment for spreading light emitted from the light emitting diode 2 so that the surface to be irradiated 3 is irradiated with the spread light.

The light emitting diode 2 is in contact with the light entrance surface 11 of the illuminating lens 1 via a bonding agent, and connected optically to the light entrance surface 11. The light that has exited the illuminating lens 1 through the light exit surface 12 reaches the surface to be irradiated 3, and thus the surface to be irradiated 3 is illuminated with that light.

Light generation in the light emitting diode 2 has no directivity in itself, and a light emitting region has a refractive index of at least 2.0. When light from the light emitting region enters a low refractive region, the refraction of the light at the interface causes the light to have the maximum intensity in the normal direction of the interface and to have a lower intensity as the angle of the light with respect to the normal line increases. As described above, since the light emitting diode 2 has high directivity, it is necessary to widen the range of transmission directions for light therefrom using the illuminating lens 1 to illuminate a larger area.

Figure 10:
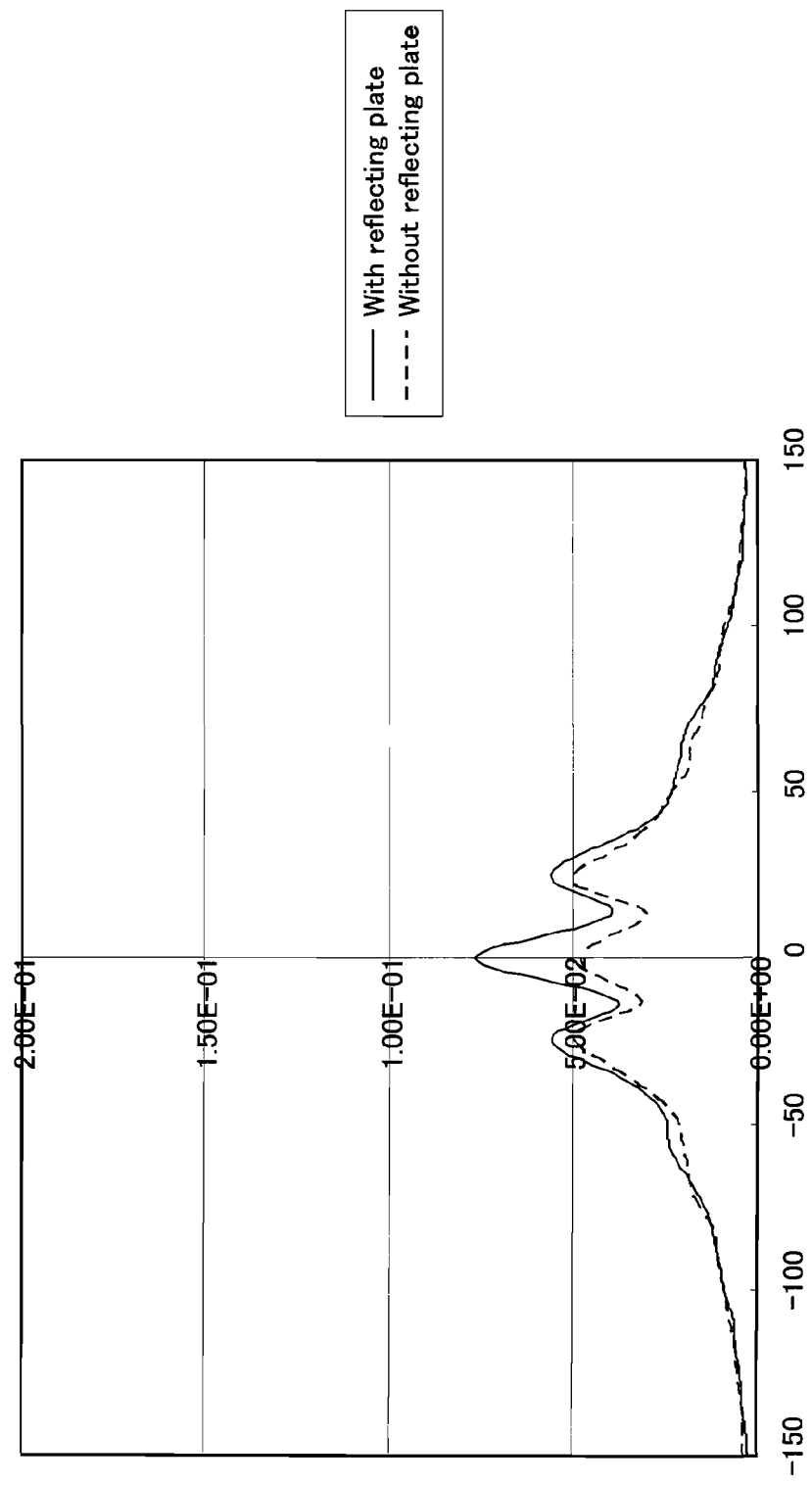
FIG. 10 shows an illuminance distribution obtained by using the lighting device according to the second embodiment of the present invention.
Figure 11:
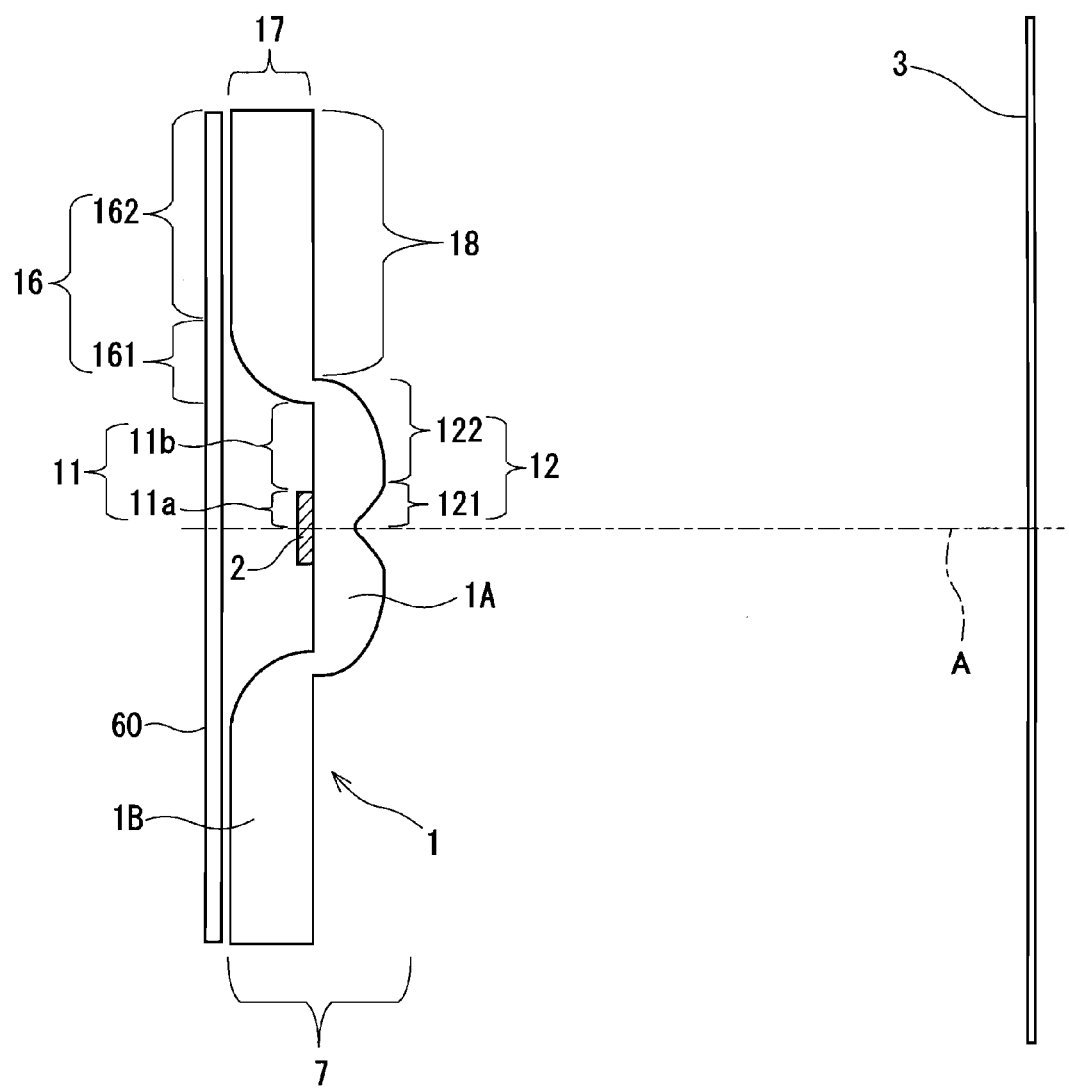
FIG. 11 is a schematic diagram showing an example in which a reflecting plate is disposed behind the lighting device according to the second embodiment of the present invention.

FIG. 10 is a graph showing the effects of the illuminating lens 1. A dotted line in FIG. 10 shows the illuminance distribution on the surface to be irradiated 3 obtained by using the lighting device 7 of the second embodiment. A solid line in FIG. 10 shows the illuminance distribution on the surface to be irradiated 3 obtained when a reflecting plate 60 is disposed behind the lighting device 7 of the second embodiment as shown in FIG. 11. A difference between the solid line and the dotted line in FIG. 10 indicates the influence of the reflecting plate 60.

Figure 12:
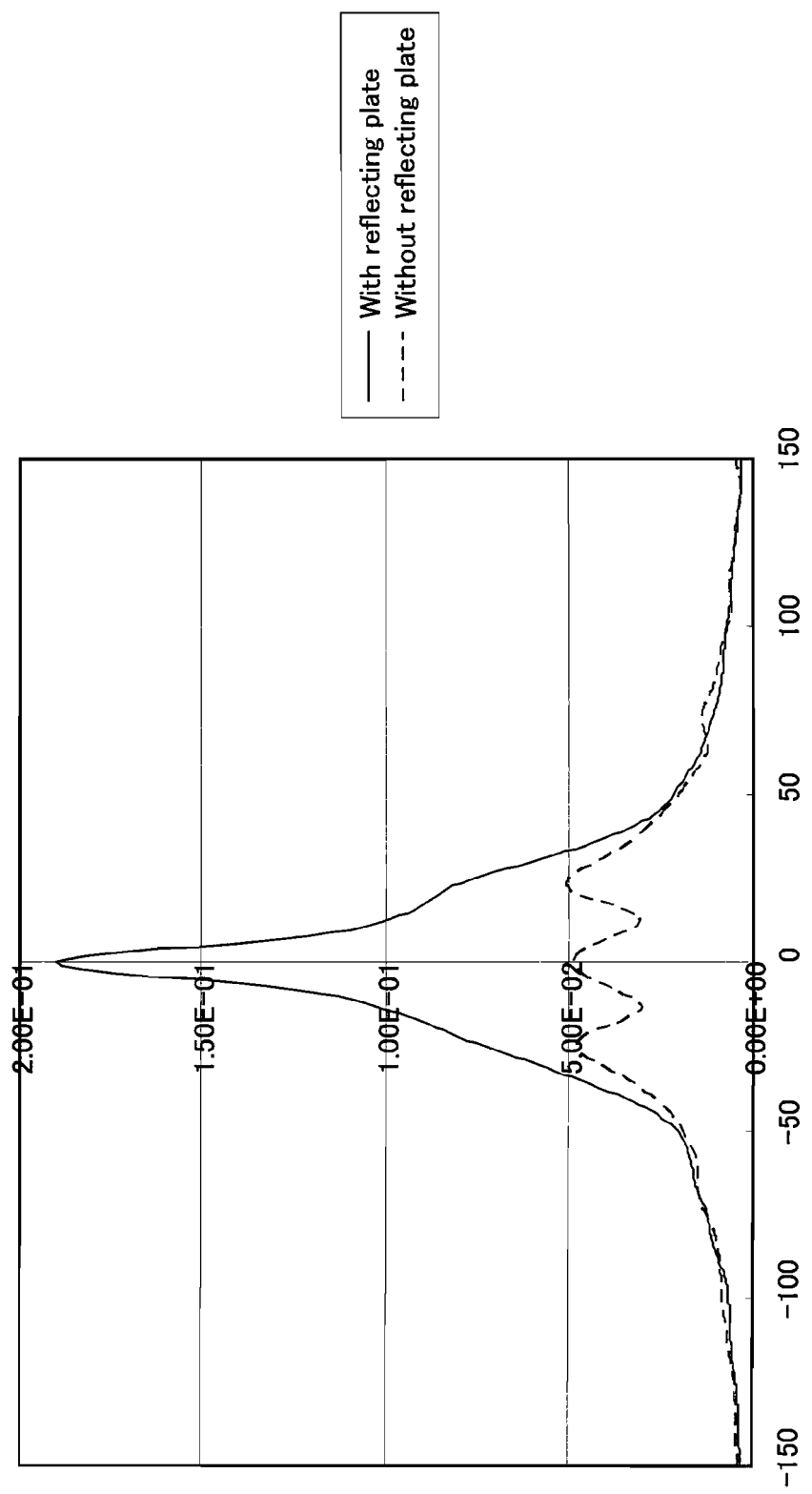
FIG. 12 shows an illuminance distribution obtained by using the lighting device in which the illuminating lens that has been conceived before is used.
Figure 13:
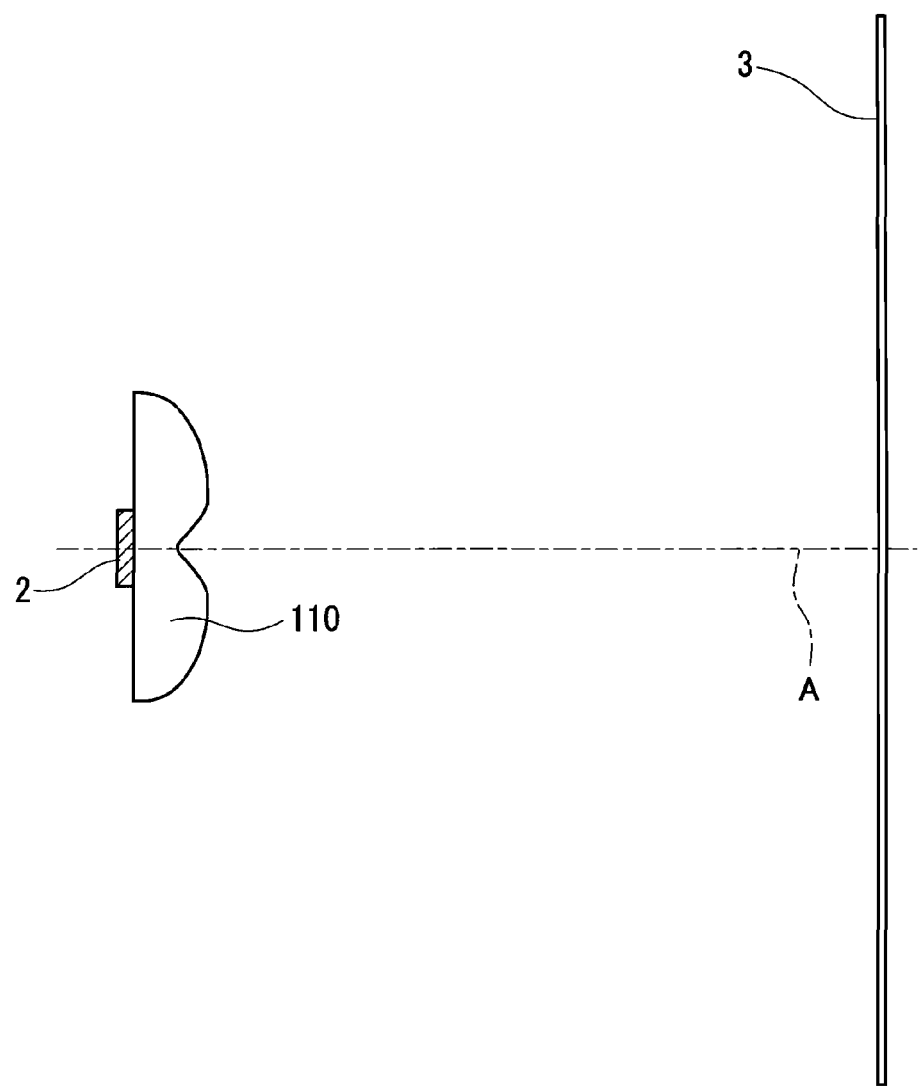
FIG. 13 is a schematic diagram of a lighting device in which an illuminating lens that has been conceived before is used.
Figure 14:
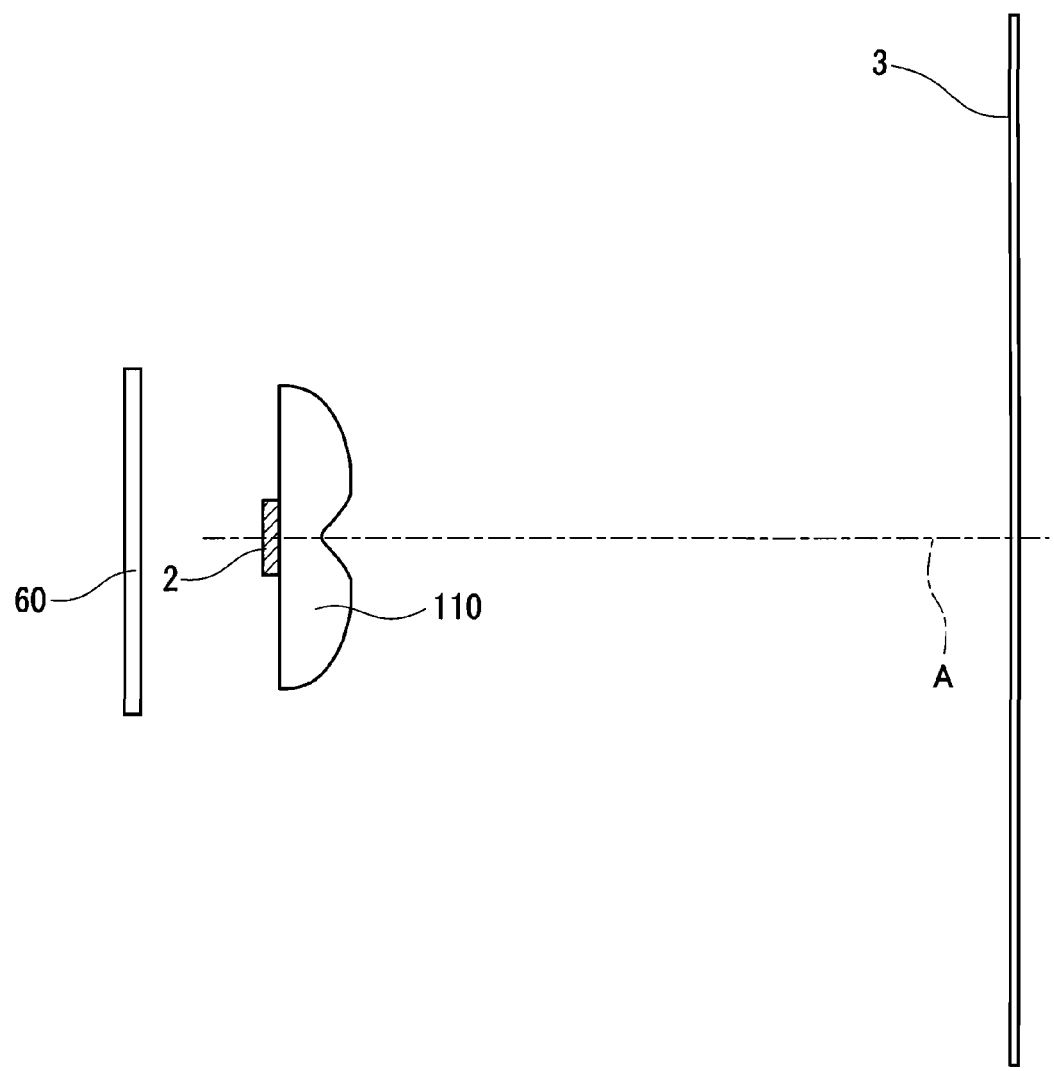
FIG. 14 is a schematic diagram of an example in which a reflecting plate is disposed behind the lighting device in which the illuminating lens that has been conceived before is used.

FIG. 12 is a graph showing the influence of the reflecting plate 60 for the illuminating lens 110 that has been conceived before. A dotted line in FIG. 12 shows the illuminance distribution on the surface to be irradiated 3 obtained by using a lighting device including the illuminating lens 110 that has been conceived before (i.e., a lens corresponding to the illuminating lens 1 without the ring portion 1B) and the light emitting diode 2, as shown in FIG. 13. A solid line in FIG. 12 shows the illuminance distribution on the surface to be irradiated 3 obtained when the reflecting plate 60 is disposed behind the lighting device of FIG. 13, as shown in FIG. 14. A difference between the solid line and the dotted line in FIG. 12 indicates the influence of the reflecting plate 60.

A comparison between FIG. 10 and FIG. 12 shows that when the lighting device 7 of the second embodiment is used, the illuminance distribution on the surface to be irradiated 3 is less influenced by a structural member disposed behind the illuminating lens 1.

As an example of specific numerical values of the present invention, Example 1 is shown below.

Example 1

Figure 15:
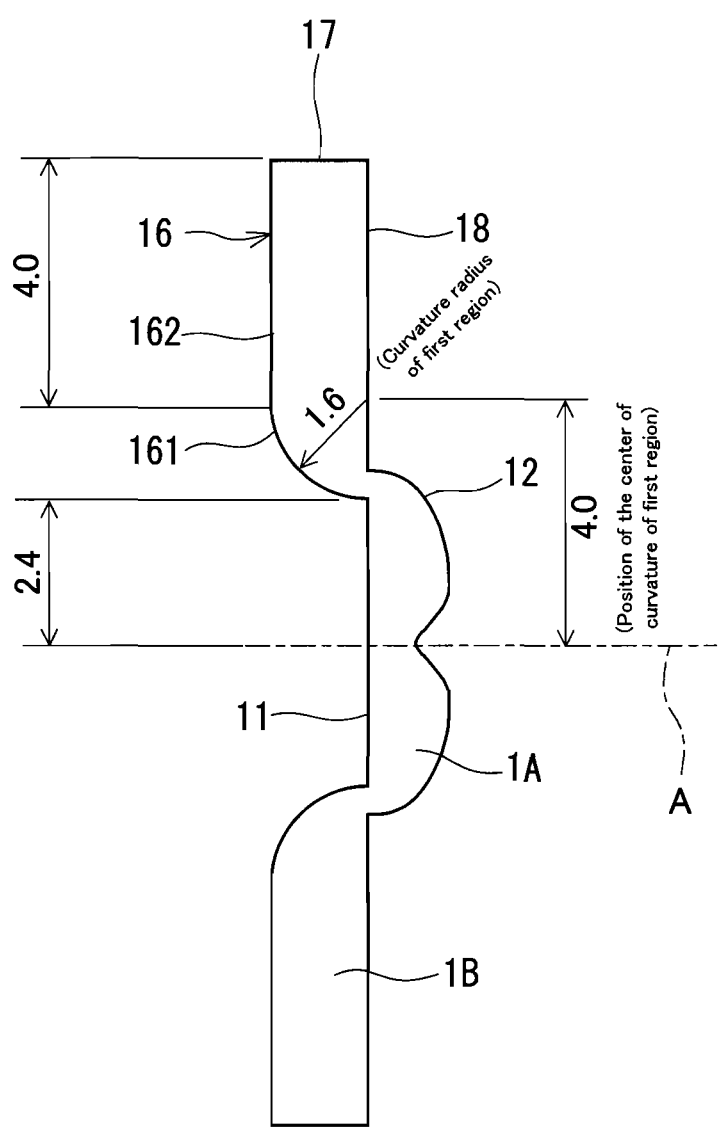
FIG. 15 is a diagram showing dimensions in Example 1 of the lighting device according to the second embodiment of the present invention.

FIG. 15 is a schematic diagram of an illuminating lens used in Example 1 of the lighting device according to the second embodiment of the present invention. Example 1 is a design example designed to widen the range of transmission directions for light from a 0.5 mm cubic-shaped light emitting diode as a light source.

As shown in FIG. 15, in Example 1, the radius of the light entrance surface 11 of the main body 1A is 2.4 mm, and the width of the second region 162 of the back surface 16 of the ring portion 1B is 4.0 mm. In a cross-sectional view including the optical axis A, the first region 161 of the back surface 16 has a shape of a circular arc with a radius of 1.6 mm, and the center of the circle is located 4.0 mm away from the optical axis A on the front surface 18 of the ring portion 1B.

Next, Table 1 below shows specific numerical values of the light exit surface 12 of the main body 1A.

TABLE 1

| θi (deg) | sagY (mm) |
|---|---|
| 0.000 | 0.800 |
| 0.715 | 0.801 |
| 1.425 | 0.804 |
| 2.126 | 0.808 |
| 2.814 | 0.814 |
| 3.489 | 0.820 |
| 4.149 | 0.827 |
| 4.794 | 0.835 |
| 5.425 | 0.842 |
| 6.041 | 0.850 |
| 6.643 | 0.859 |
| 7.231 | 0.867 |
| 7.805 | 0.875 |
| 8.366 | 0.884 |
| 8.914 | 0.893 |
| 9.450 | 0.901 |
| 9.973 | 0.910 |
| 10.485 | 0.919 |
| 10.985 | 0.927 |
| 11.474 | 0.936 |
| 11.952 | 0.945 |
| 12.420 | 0.954 |
| 12.878 | 0.962 |
| 13.326 | 0.971 |
| 13.764 | 0.980 |
| 14.194 | 0.988 |
| 14.615 | 0.997 |
| 15.027 | 1.006 |
| 15.431 | 1.014 |
| 15.828 | 1.023 |
| 16.216 | 1.032 |
| 16.598 | 1.040 |
| 16.973 | 1.048 |
| 17.340 | 1.057 |
| 17.702 | 1.065 |
| 18.057 | 1.074 |
| 18.406 | 1.082 |
| 18.750 | 1.090 |
| 19.088 | 1.098 |
| 19.421 | 1.106 |
| 19.748 | 1.114 |
| 20.072 | 1.122 |
| 20.390 | 1.130 |
| 20.704 | 1.138 |
| 21.014 | 1.145 |
| 21.320 | 1.153 |
| 21.623 | 1.160 |
| 21.921 | 1.168 |
| 22.217 | 1.175 |
| 22.509 | 1.182 |
| 22.798 | 1.190 |
| 23.084 | 1.197 |
| 23.368 | 1.203 |
| 23.649 | 1.210 |
| 23.928 | 1.217 |
| 24.204 | 1.224 |
| 24.479 | 1.230 |
| 24.751 | 1.236 |
| 25.022 | 1.243 |
| 25.291 | 1.249 |
| 25.559 | 1.255 |
| 25.825 | 1.260 |
| 26.090 | 1.266 |
| 26.354 | 1.272 |
| 26.616 | 1.277 |
| 26.878 | 1.282 |
| 27.139 | 1.288 |
| 27.400 | 1.293 |
| 27.660 | 1.297 |
| 27.919 | 1.302 |
| 28.178 | 1.307 |
| 28.436 | 1.311 |
| 28.695 | 1.315 |
| 28.953 | 1.319 |
| 29.212 | 1.323 |
| 29.470 | 1.327 |
| 29.728 | 1.331 |
| 29.987 | 1.334 |

TABLE 1-continued

| θi (deg) | sagY (mm) |
|---|---|
| 30.246 | 1.338 |
| 30.506 | 1.341 |
| 31.025 | 1.347 |
| 31.286 | 1.349 |
| 31.547 | 1.352 |
| 31.809 | 1.354 |
| 32.072 | 1.357 |
| 32.335 | 1.359 |
| 32.599 | 1.360 |
| 32.863 | 1.362 |
| 33.128 | 1.364 |
| 33.394 | 1.365 |
| 33.661 | 1.367 |
| 33.928 | 1.368 |
| 34.196 | 1.369 |
| 34.465 | 1.370 |
| 34.734 | 1.370 |
| 35.003 | 1.371 |
| 35.273 | 1.371 |
| 35.543 | 1.372 |
| 35.813 | 1.372 |
| 36.084 | 1.372 |
| 36.354 | 1.372 |
| 36.624 | 1.372 |
| 36.894 | 1.372 |
| 37.162 | 1.372 |
| 37.430 | 1.372 |
| 37.696 | 1.372 |
| 37.961 | 1.371 |
| 38.224 | 1.371 |
| 38.485 | 1.371 |
| 38.743 | 1.371 |
| 38.998 | 1.371 |
| 39.249 | 1.371 |
| 39.495 | 1.371 |
| 39.746 | 1.371 |
| 40.007 | 1.370 |
| 40.266 | 1.369 |
| 40.525 | 1.369 |
| 40.782 | 1.368 |
| 41.038 | 1.367 |
| 41.293 | 1.366 |
| 41.546 | 1.365 |
| 41.799 | 1.365 |
| 42.050 | 1.364 |
| 42.300 | 1.363 |
| 42.550 | 1.362 |
| 42.798 | 1.361 |
| 43.045 | 1.360 |
| 43.290 | 1.359 |
| 43.535 | 1.358 |
| 43.799 | 1.357 |
| 44.022 | 1.355 |
| 44.264 | 1.354 |
| 44.505 | 1.353 |
| 44.745 | 1.352 |
| 44.985 | 1.351 |
| 45.223 | 1.349 |
| 45.461 | 1.348 |
| 45.697 | 1.347 |
| 45.933 | 1.345 |
| 46.168 | 1.344 |
| 46.403 | 1.343 |
| 46.636 | 1.341 |
| 46.869 | 1.340 |
| 47.101 | 1.338 |
| 47.333 | 1.336 |
| 47.564 | 1.335 |
| 47.794 | 1.333 |
| 48.024 | 1.331 |
| 48.253 | 1.330 |
| 48.481 | 1.328 |
| 48.709 | 1.326 |
| 48.937 | 1.324 |
| 49.164 | 1.322 |
| 49.391 | 1.320 |
| 49.617 | 1.318 |
| 49.843 | 1.316 |

TABLE 1-continued

| θi (deg) | sagY (mm) |
|---|---|
| 50.068 | 1.314 |
| 50.293 | 1.312 |
| 50.518 | 1.310 |
| 50.742 | 1.308 |
| 50.966 | 1.305 |
| 51.190 | 1.303 |
| 51.414 | 1.301 |
| 51.637 | 1.298 |
| 51.861 | 1.296 |
| 52.084 | 1.293 |
| 52.307 | 1.290 |
| 52.530 | 1.288 |
| 52.753 | 1.285 |
| 52.976 | 1.282 |
| 53.199 | 1.279 |
| 53.421 | 1.276 |
| 53.644 | 1.273 |
| 53.867 | 1.270 |
| 54.090 | 1.267 |
| 54.314 | 1.264 |
| 54.537 | 1.261 |
| 54.761 | 1.257 |
| 54.984 | 1.254 |
| 55.208 | 1.251 |
| 55.433 | 1.247 |
| 55.658 | 1.243 |
| 55.883 | 1.240 |
| 56.108 | 1.236 |
| 56.334 | 1.232 |
| 56.560 | 1.228 |
| 56.787 | 1.224 |
| 57.014 | 1.220 |
| 57.242 | 1.216 |
| 57.470 | 1.212 |
| 57.699 | 1.208 |
| 57.929 | 1.203 |
| 58.159 | 1.199 |
| 58.390 | 1.194 |
| 58.622 | 1.189 |
| 58.854 | 1.184 |
| 59.087 | 1.180 |
| 59.322 | 1.175 |
| 59.557 | 1.170 |
| 59.793 | 1.164 |
| 60.030 | 1.159 |
| 60.268 | 1.154 |
| 60.507 | 1.148 |
| 60.747 | 1.143 |
| 60.989 | 1.137 |
| 61.231 | 1.131 |
| 61.475 | 1.125 |
| 61.720 | 1.119 |
| 61.967 | 1.113 |
| 62.215 | 1.107 |
| 62.464 | 1.100 |
| 62.715 | 1.094 |
| 62.967 | 1.087 |
| 63.221 | 1.080 |
| 63.477 | 1.073 |
| 63.734 | 1.066 |
| 63.993 | 1.059 |
| 64.254 | 1.051 |
| 64.516 | 1.044 |
| 64.781 | 1.036 |
| 65.047 | 1.028 |
| 65.316 | 1.020 |
| 65.587 | 1.012 |
| 65.856 | 1.004 |
| 66.135 | 0.995 |
| 66.412 | 0.987 |
| 66.692 | 0.978 |
| 66.974 | 0.969 |
| 67.259 | 0.960 |
| 67.546 | 0.951 |
| 67.836 | 0.941 |
| 68.129 | 0.931 |
| 68.424 | 0.921 |
| 68.723 | 0.911 |
| 69.024 | 0.901 |
| 69.329 | 0.890 |
| 69.637 | 0.880 |
| 69.948 | 0.869 |
| 70.263 | 0.858 |
| 70.581 | 0.846 |
| 70.902 | 0.834 |
| 71.228 | 0.823 |
| 71.557 | 0.810 |

Figure 16:
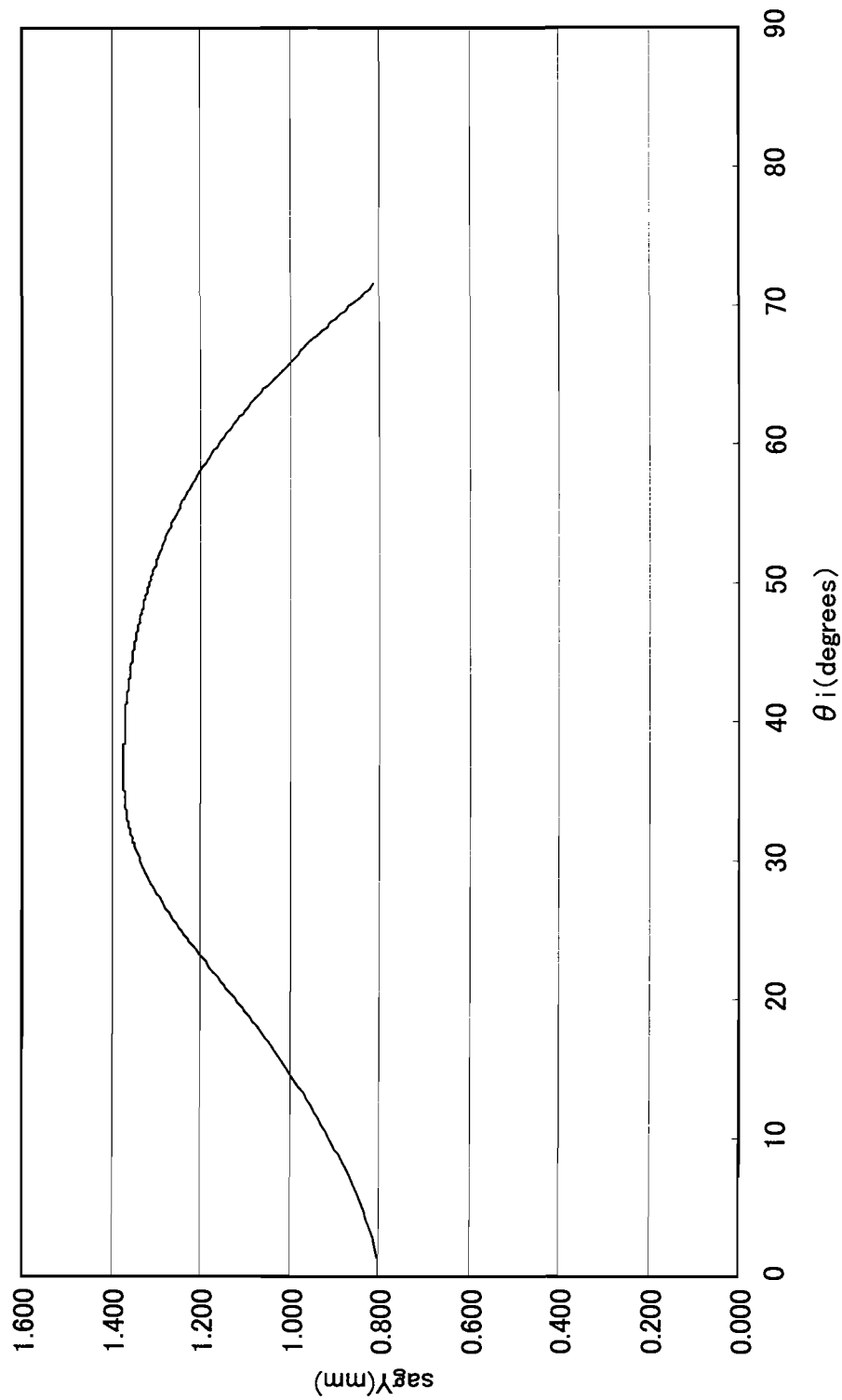
FIG. 16 is a graph showing a relationship between θi and sagY, which represent the shape of the light exit surface in Example 1 of the lighting device according to the second embodiment of the present invention (i.e., a graph obtained by plotting the values in Table 1).

In Table 1, θi is an angle between the optical axis A and a straight line connecting the position of the light source (starting point Q) on the optical axis A and an arbitrary point on the light exit surface 12. Furthermore, in Table 1, sagY is a distance along the optical axis A between the light source position (starting point Q) on the optical axis A and the arbitrary point on the light exit surface 12. FIG. 16 is a graph obtained by plotting the values of θi and sagY in Table 1.

Third Embodiment

Figure 17:
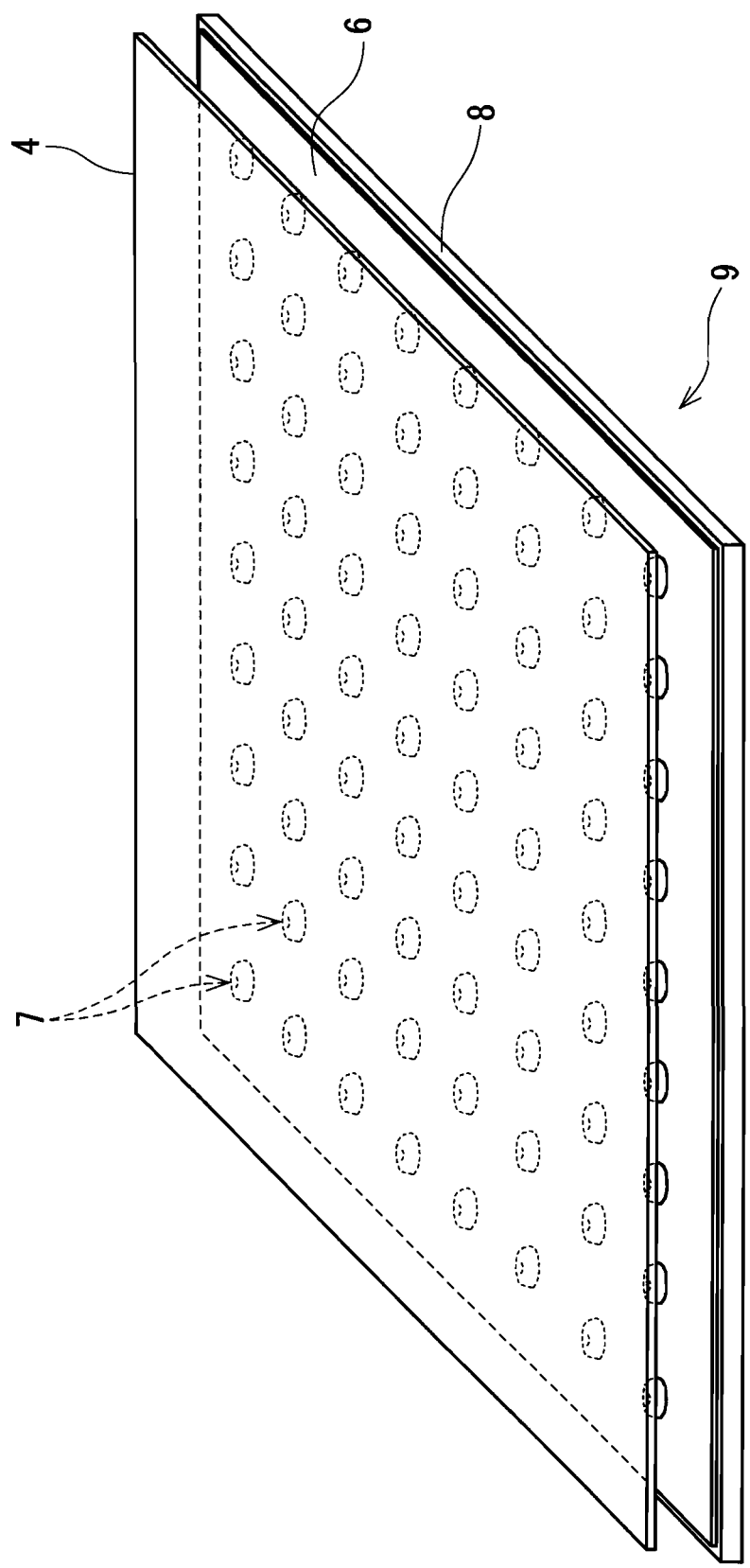
FIG. 17 is a schematic diagram of a surface light source according to a third embodiment of the present invention.

FIG. 17 is a schematic diagram of a surface light source 9 according to a third embodiment of the present invention. This surface light source 9 includes a plurality of lighting devices 7 of the second embodiment arranged in a plane, and a diffusing plate 4 disposed to cover the plurality of lighting devices 7. The lighting devices 7 may be arranged in a matrix as shown in FIG. 17. They may be arranged in a staggered manner. In FIG. 17, the ring portion 1B of the illuminating lens 1 is not illustrated for simplification of the drawing.

Figure 18:
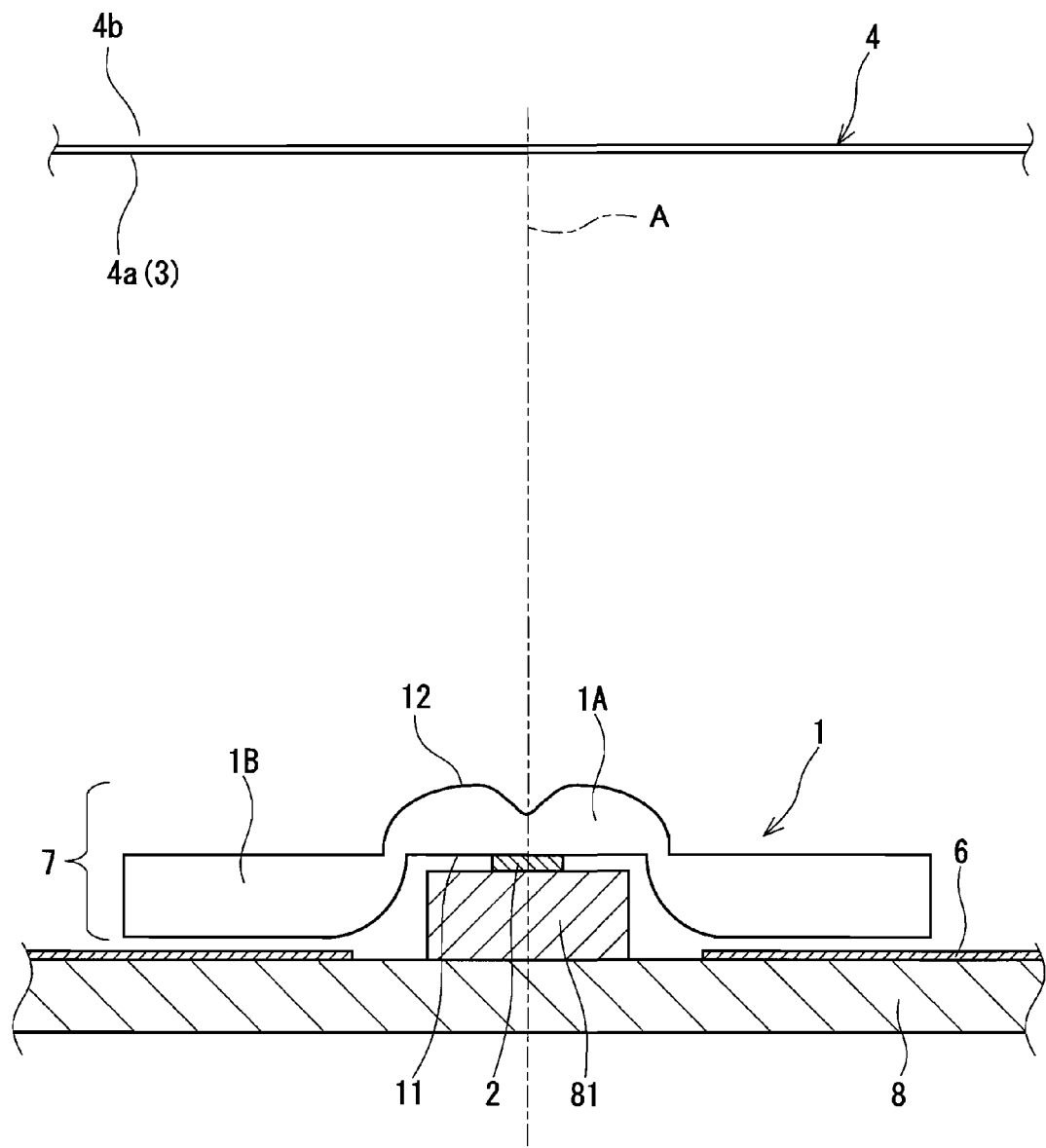
FIG. 18 is a partial cross-sectional view of the surface light source according to the third embodiment of the present invention.

The surface light source 9 includes a substrate 8 facing the diffusing plate 4 with the lighting devices 7 being disposed therebetween. As shown in FIG. 18, the light emitting diode 2 of each lighting device 7 is mounted on the substrate 8 via an interposer substrate 81. In the present embodiment, a reflecting plate 6 is disposed on the substrate 8 to cover the substrate 8 with the light emitting diodes 2 being exposed.

The lighting device 7 emits light to one surface 4a of the diffusing plate 4. That is, the one surface 4a of the diffusing plate 4 is the surface to be irradiated 3 that has been described in the first and second embodiments. The diffusing plate 4 emits the light received on its one surface 4a from the other surface 4b in a diffused manner. The lighting devices 7 emit light individually toward a large area of the one surface 4a of the diffusing plate 4 so that the one surface 4a has a uniform illuminance, and upon receiving this light, the diffusing plate 4 emits the light diffusely. As a result, the surface light source capable of emitting light having less uneven brightness in the plane is obtained.

The light emitted from the lighting device 7 is diffused by the diffusing plate 4 so that the diffuse light returns to the lighting device side or passes through the diffusing plate 4. The light that has returned to the lighting device side and struck the reflecting plate 6 is reflected at the reflecting plate 6 and again enters the diffusing plate 4.

Fourth Embodiment

Figure 19:
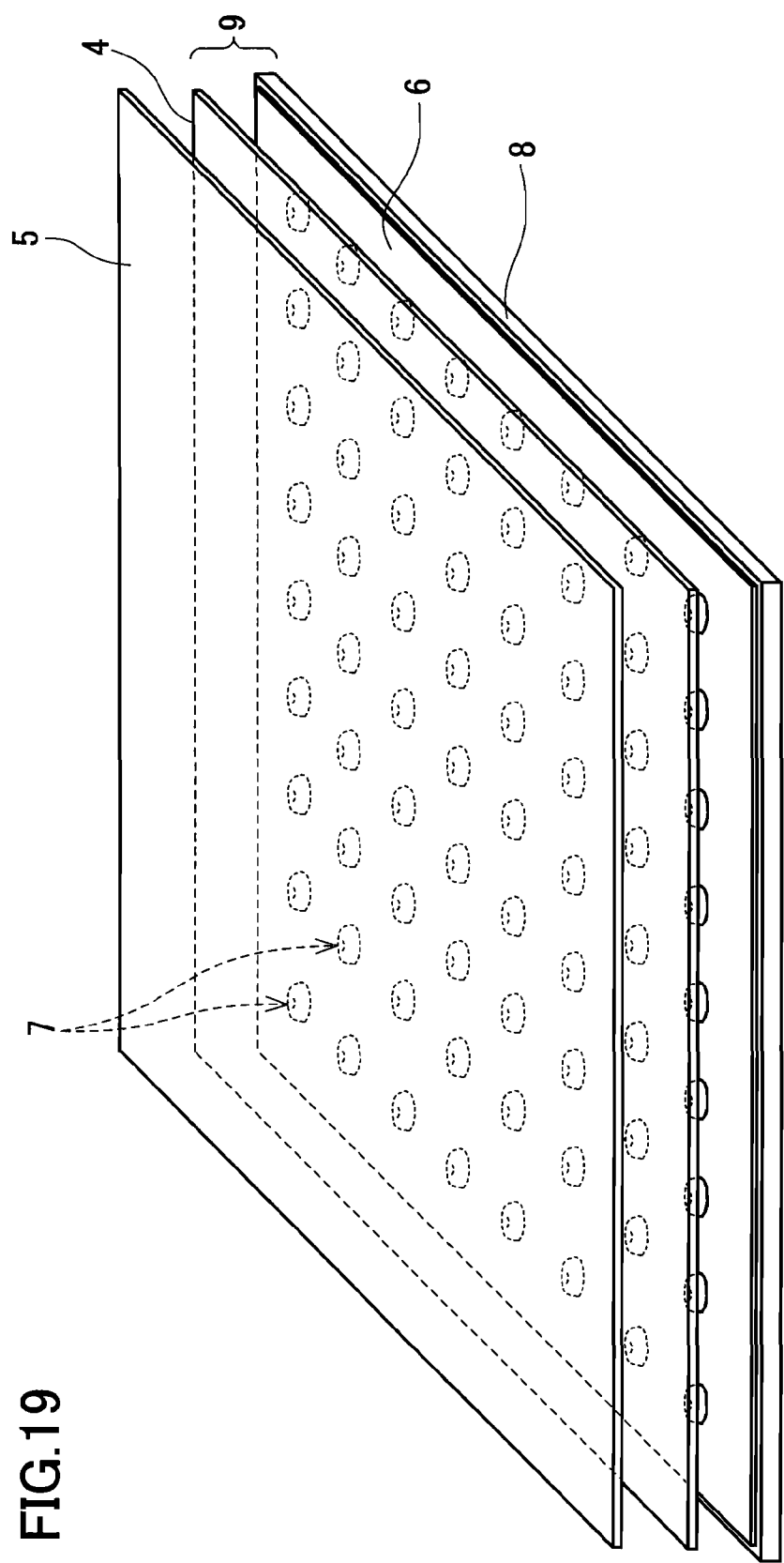
FIG. 19 is a schematic diagram of a liquid-crystal display apparatus according to a fourth embodiment of the present invention.

FIG. 19 is a schematic diagram of a liquid-crystal display apparatus according to a fourth embodiment of the present invention. This liquid-crystal display apparatus includes a liquid-crystal panel 5, and a surface light source 9 of the third embodiment disposed behind the liquid-crystal panel 5.

A plurality of lighting devices 7 each including the light emitting diode 2 and the illuminating lens 1 are arranged in a plane, and the diffusing plate 4 is illuminated by these lighting devices 7. The underside (one surface) of the diffusing plate 4 is irradiated with the light emitted from the lighting devices 7 to have a uniform illuminance, and then the light is diffused by the diffusing plate 4. Thus, the liquid-crystal panel 5 is illuminated by the diffused light.

It is preferable that an optical sheet such as a diffusing sheet or a prism sheet is disposed between the liquid-crystal panel 5 and the surface light source 9. In this case, the light that has passed through the diffusing plate 4 further is diffused by the optical sheet and illuminates the liquid-crystal panel 5.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An illuminating lens for spreading light emitted from a light source so that a surface to be irradiated is irradiated with the spread light, the lens comprising:
   a main body to be disposed over the light source; and
   a ring portion joined to a periphery of the main body so as to be located around the light source,
   wherein the main body includes: a light entrance surface through which the light emitted from the light source enters the lens; and a light exit surface through which the light that has entered the lens exits the lens,
   the light exit surface has a first light exit surface and a second light exit surface, the first light exit surface being recessed toward a point on an optical axis of the illuminating lens, and the second light exit surface extending outwardly from a periphery of the first light exit surface to form a convex surface,
   the first light exit surface has a transmissive region located in the center of the first light exit surface and a total reflection region located around the transmissive region, the transmissive region being capable of transmitting light that has been emitted from a starting point at a relatively small angle with respect to the optical axis and then reached the first light exit surface, when a position of the light source on the optical axis is defined as the starting point, and the total reflection region being capable of totally reflecting light that has been emitted from the starting point at a relatively large angle with respect to the optical axis and then reached the first light exit surface,
   the second light exit surface has a shape capable of transmitting approximately the entire amount of light that has been emitted from the starting point and then directly reached the second light exit surface, and of totally reflecting approximately the entire amount of the light that has been totally reflected at the total reflection region and then reached the second light exit surface,
   the ring portion has a front surface extending outwardly from a periphery of the light exit surface, a back surface extending outwardly from a periphery of the light entrance surface, and an end surface connecting an outer edge of the front surface and an outer edge of the back surface,
   the back surface has a shape such that light that has been emitted from the light source, totally reflected repeatedly at the light exit surface, and then entered the ring portion is guided to the end surface by total reflection, and
   the end surface has a shape such that light that has been totally reflected at the back surface and reached the end surface is refracted to reach the surface to be irradiated.

2. The illuminating lens according to claim 1, wherein the light exit surface is axisymmetric with respect to the optical axis.

3. The illuminating lens according to claim 1, wherein the back surface has a first region extending outwardly from the periphery of the light entrance surface to form a convex surface and a flat second region extending continuously from the first region.

4. The illuminating lens according to claim 3, wherein the second region has a larger width than the first region in a direction radially outward from the optical axis.

5. The illuminating lens according to claim 3, wherein a distance from the light entrance surface to the second region is longer than a maximum distance from the light entrance surface to the light exit surface in an optical axis direction in which the optical axis extends.

6. The illuminating lens according to claim 3, wherein a tangential direction of an outermost periphery of the second light exit surface is approximately parallel to that of an innermost periphery of the first region in a cross-sectional view including the optical axis.

7. The illuminating lens according to claim 3, wherein a tangential direction of an innermost periphery of the first region is parallel to the optical axis in a cross-sectional view including the optical axis.

8. The illuminating lens according to claim 1, wherein the entire second light exit surface transmits the light that has been emitted from the starting point.

9. The illuminating lens according to claim 1, wherein the second light exit surface totally reflects a part of the light that has been emitted from the starting point and then directly reached the second light exit surface, and transmits the remaining part of the light.

10. A lighting device comprising:
    a light emitting diode for emitting light; and
    an illuminating lens for spreading light emitted from the light emitting diode so that a surface to be irradiated is irradiated with the spread light,
    wherein the illuminating lens is the illuminating lens according to claim 1.

11. A surface light source comprising:
    a plurality of lighting devices arranged in a plane; and
    a diffusing plate disposed to cover the plurality of lighting devices, the diffusing plate being configured to receive on one surface thereof light emitted from the plurality of lighting devices and to emit the light from the other surface thereof in a diffused manner,
    wherein each of the plurality of lighting devices is the lighting device according to claim 10.

12. The surface light source according to claim 11, further comprising:
    a substrate on which the light emitting diode included in each of the plurality of lighting devices is mounted, the substrate facing the diffusing plate with the plurality of lighting devices being disposed therebetween; and
    a reflecting plate disposed on the substrate to cover the substrate with the light emitting diodes being exposed.

13. A liquid-crystal display apparatus comprising:
    a liquid-crystal panel; and
    the surface light source according to claim 11 disposed behind the liquid-crystal panel.

14. The illuminating lens according to claim 1, wherein:
the light entrance surface having a recess formed toward the light exit surface at the optical axis of the illuminating lens; and
the light source is configured to be disposed into the recess of the light entrance surface.

15. The lighting device according to claim 10, wherein an air space is provided between the light emitting diode and the light entrance surface such that the light emitting diode does not directly contact the light entrance surface.

16. The illuminating lens according to claim 1, wherein the second light exit surface faces toward the surface to be irradiated.

17. The illuminating lens according to claim 1, wherein a portion of the second light exit surface faces toward the surface to be irradiated.

18. The illuminating lens according to claim 1, wherein:
at least a portion of the second light exit surface is disposed between the light entrance surface and the surface to be irradiated, and is disposed opposite to the light entrance surface.

19. The illuminating lens according to claim 1, wherein:
the first light exit surface has a discontinuity between the first light exit surface and the second light exit surface.

\* \* \* \* \*